(12) United States Patent
Riley

(10) Patent No.: US 10,553,246 B2
(45) Date of Patent: Feb. 4, 2020

(54) SYSTEMS AND METHODS FOR READING PHONOGRAPHIC RECORD DATA

(71) Applicant: Logan Riley, San Francisco, CA (US)

(72) Inventor: Logan Riley, San Francisco, CA (US)

(*) Notice: Subject to any disclaimer, the term of this patent is extended or adjusted under 35 U.S.C. 154(b) by 0 days.

(21) Appl. No.: 16/423,143

(22) Filed: May 27, 2019

(65) Prior Publication Data

US 2019/0279679 A1    Sep. 12, 2019

Related U.S. Application Data

(63) Continuation-in-part of application No. 15/658,051, filed on Jul. 24, 2017, now Pat. No. 10,304,479.

(51) Int. Cl.
*G11B 3/40* (2006.01)
*G11B 19/28* (2006.01)
*G11B 3/48* (2006.01)
*G11B 19/20* (2006.01)

(52) U.S. Cl.
CPC ............... *G11B 19/28* (2013.01); *G11B 3/40* (2013.01); *G11B 3/48* (2013.01); *G11B 19/2009* (2013.01)

(58) Field of Classification Search
None
See application file for complete search history.

(56) References Cited

U.S. PATENT DOCUMENTS

| 1,381,827 A | 6/1921 | Hanson |
| 1,616,416 A | 2/1927 | Fessenden |
| 1,863,841 A | 6/1932 | Fessenden |
| 2,236,431 A * | 3/1941 | Hollingsworth ......... A63H 5/00 446/410 |
| 2,316,076 A | 4/1943 | Knoebel |
| 3,107,277 A | 10/1963 | Rogers |
| 3,479,038 A | 11/1969 | Eisner |
| 3,482,841 A * | 12/1969 | Doring ..................... G11B 3/40 369/177 |
| 3,927,316 A | 12/1975 | Citta |
| 4,166,624 A | 9/1979 | Mori et al. |
| 4,232,202 A | 11/1980 | Mori et al. |
| 4,284,279 A | 8/1981 | Mori |
| 4,498,164 A * | 2/1985 | Lebensfeld ............ G11B 3/40 369/177 |
| 9,583,122 B2 | 2/2017 | Pinhas |
| 9,672,844 B2 | 6/2017 | Pinhas |
| 2007/0254695 A1 | 11/2007 | Langberg et al. |

(Continued)

FOREIGN PATENT DOCUMENTS

CN    205862790 U    1/2017
DE    202013006884 U1    8/2013

(Continued)

*Primary Examiner* — William J Klimowicz
(74) *Attorney, Agent, or Firm* — Redbrick IP, P.C.

(57) ABSTRACT

Systems and methods discussed herein are related to read data stored on phonographic records. In various examples, systems and methods may describe a needle assembly able to pivot with respect to a record player body, and include a gate able to block light transmitted from a light emitter. The record player may include a motor and a set of wheels such that it can travel around a stationary phonographic record, and a microcontroller capable of determining a target linear travel speed of the record player and receive and transmit data from the phonographic record.

20 Claims, 19 Drawing Sheets

(56) References Cited

U.S. PATENT DOCUMENTS

| | | | |
|---|---|---|---|
| 2011/0172793 A1 | 7/2011 | Richards et al. | |
| 2016/0337614 A1 | 11/2016 | Siminoff et al. | |
| 2017/0025134 A1 | 2/2017 | Pinhas | |
| 2017/0125039 A1* | 5/2017 | Pinhas | G11B 21/043 |
| 2019/0027166 A1* | 1/2019 | Riley | G11B 3/44 |
| 2019/0244633 A1* | 8/2019 | Ono | G11B 3/34 |

FOREIGN PATENT DOCUMENTS

| | | | |
|---|---|---|---|
| GB | 313904 A | 3/1885 | |
| GB | 288711 A | 4/1928 | |
| GB | 649048 A | 1/1951 | |
| GB | 1119963 A | 7/1968 | |
| GB | 2476327 A | 11/2011 | |
| JP | 54070803 A | 6/1979 | |
| JP | 54155009 A | 12/1979 | |
| JP | 54160201 A | 12/1979 | |
| JP | 54160203 A | 12/1979 | |
| JP | 54160204 A | 12/1979 | |
| JP | 54160205 A | 12/1979 | |
| JP | 55012577 A | 1/1980 | |
| JP | 55034359 A | 3/1980 | |
| JP | 57078602 A | 5/1982 | |
| JP | 54160202 A | 11/1985 | |

* cited by examiner

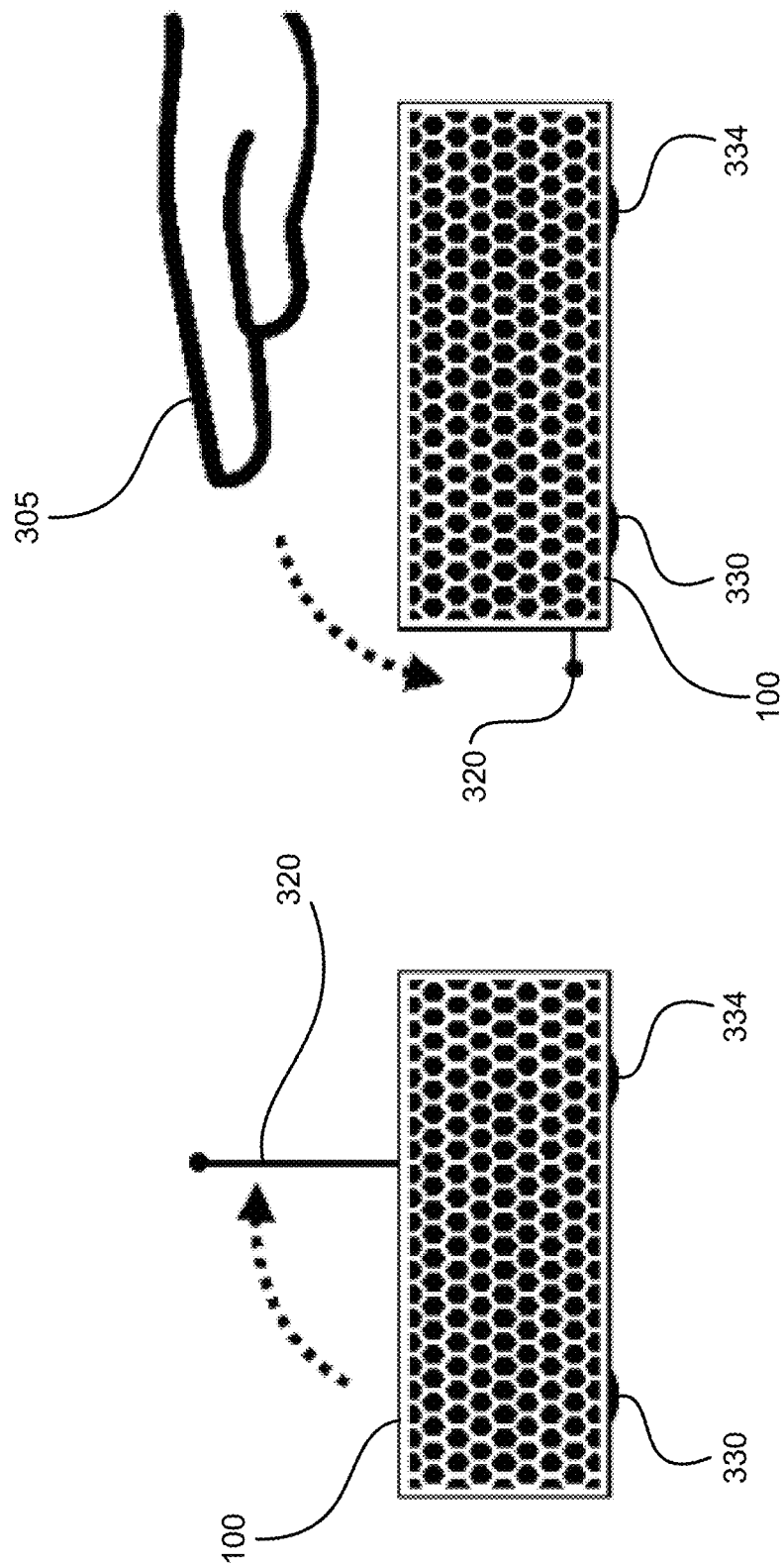

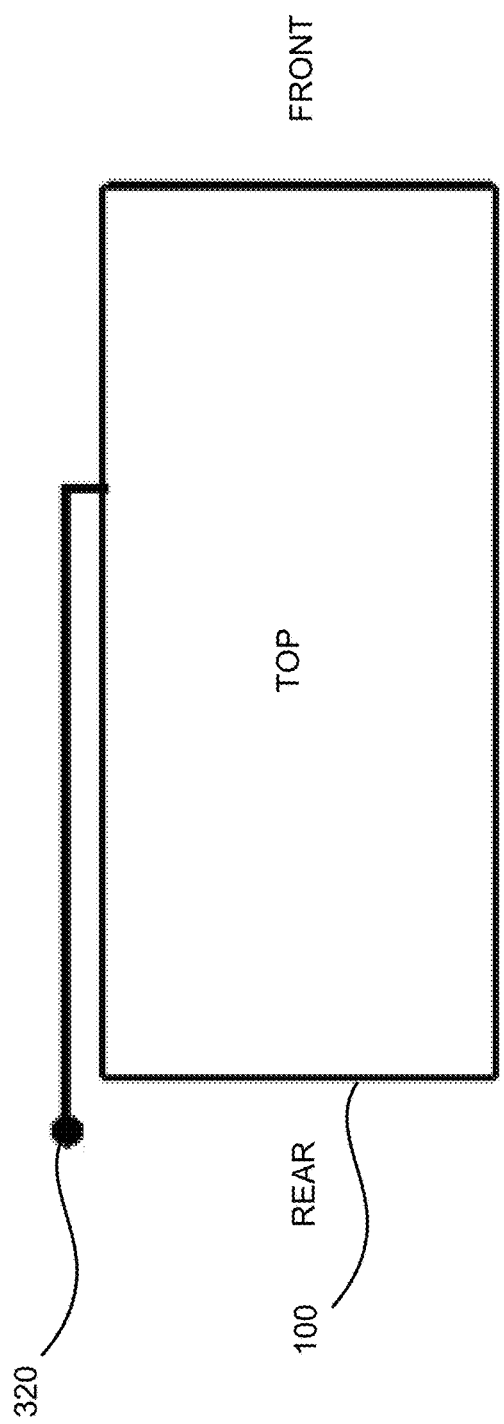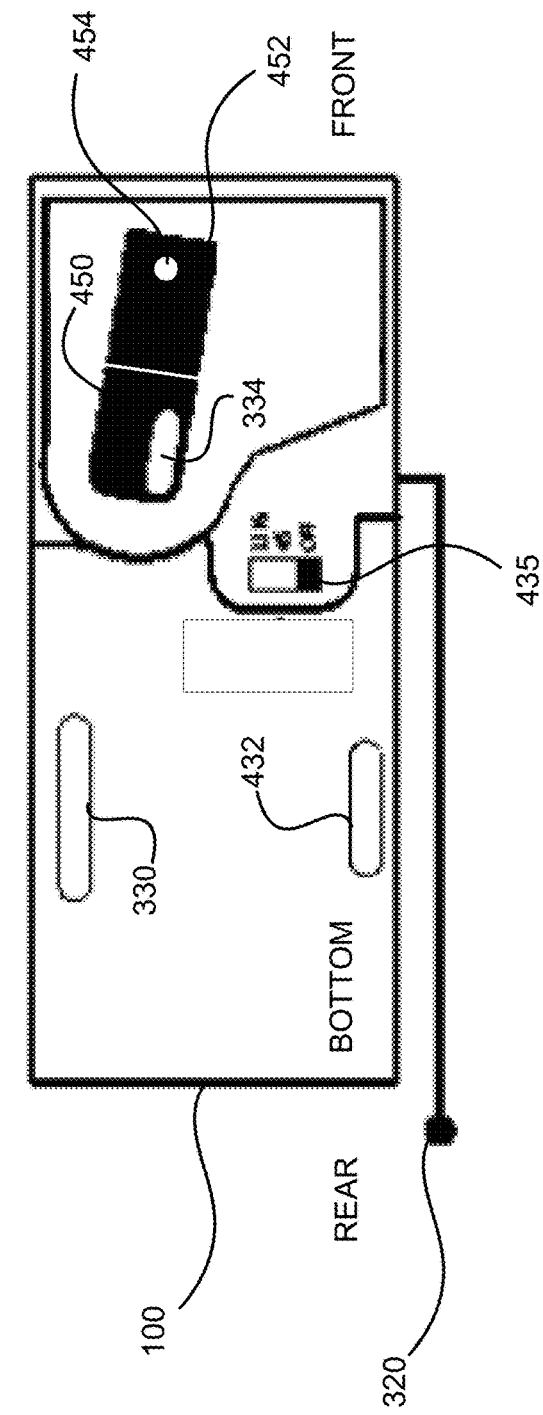
Fig. 4A
Fig. 4B

SYSTEMS AND METHODS FOR READING PHONOGRAPHIC RECORD DATA

CROSS-REFERENCE TO RELATED APPLICATIONS

The present application is a continuation-in-part of U.S. patent application Ser. No. 15/658,051, entitled "SYSTEM, DEVICE, AND METHOD FOR WIRELESS AUDIO TRANSMISSION," filed on Jul. 24, 2017, which claims priority to U.S. Provisional Patent Application No. 62/418,355, entitled "WIRELESS AUDIO TRANSMITTING RECORD PLAYING DEVICE," filed on Nov. 7, 2016. The present application incorporates these applications by reference in their entirety for all purposes.

BACKGROUND

Conventional record players tend to be large, heavy, and difficult to move. To solve this problem, a small and mobile record player that can fit in a pocket or backpack is desired. Such a record player may be placed on top of a phonographic record, and travel (using a motor and wheels) in a spiral-like pattern around a record toward the center of the record. While moving in a spiral, the record player's needle/stylus vibrates as it moves through the grooves of a record representing recorded audio, and those vibrations travel to wires in a cartridge at the end of the needle. Typically, a coil in a magnetic field converts the vibrations into electrical signals that are carried along wires to an amplifier. The amplifier may create boosted signals that are converted into sound through a speaker, producing the sounds and music recorded on vinyl records.

Because different types of records only sound as intended at a speed particular to that record, record players must be able to cause a needle to travel at different speeds. For example, a record that is 12-inches wide may play as intended when the needle is traveling around a record at a speed of 33 and ⅓ rotations per minute (RPM). Other records, which may be between 7-inches wide, may play as intended when the needle traveling around a record at a speed of 45 RPM.

When traveling around a stationary record, small record players as described herein may be configured in certain ways to playback sounds as intended.

SUMMARY

In general, in one aspect, embodiments described herein relate to a system capable of reading data stored on a phonographic record. Such a system may include a needle assembly operable to pivot with respect to a record player body, mount a needle capable of reading data stored on a phonographic record, and that includes a light gate operable to variably block emitted light proportional to a pivot angle of the needle assembly. A system may also include a record player body that includes a motor and a set of wheels enabling the record player body to travel around a stationary phonographic record, a microprocessor operable to calculate a target linear travel speed of the record player body, and receive data stored on a phonographic record. Such a system may also include a light emitter, a light sensor capable of measuring light intensity from the light emitter—which may be variably blocked by the light gate. A system may also include a gyroscope and a wireless transmitter capable of transmitting audio data.

In general, in one embodiment, a method is described where a record player body is caused by a microcontroller to travel around a stationary phonographic record at a travel speed. A turning angle of the record player body may be measured with respect to the stationary phonographic record. A radial position of the record body may be determined based on the turn angle. Further, an elapsed time between two angular positions of the record player body with respect to the stationary phonographic record is measured. A center-to-center groove spacing based on an elapsed time may be determined, and a target linear travel speed of the record player body based on the turn angle of the record player body and the center-to-center groove spacing may be determined by the microcontroller. In addition, the MCU may cause a record player body may travel at the linear travel speed, the needle to read data stored on the stationary phonographic record, and a wireless transmitter to wirelessly transmit audio data derived from data stored on the stationary phonographic record.

In general, in one embodiment, a method is described where a microcontroller causes a record player body to travel around a phonographic record at a linear travel speed and a needle to read data stored on the stationary phonographic record. A turn angle of the record player body may be measured with respect to the stationary phonographic record. A center-to-center groove spacing of the stationary phonographic record may also be measured. Further, a target linear travel speed of the record player body may be determined based on the turn angle of the record player body and the center-to-center groove spacing. In addition, the MCU may cause the record player body to travel at the target linear travel speed, and a wireless transmitter to transmit audio data derived from the data stored on the stationary phonographic record.

Other aspects of the invention will be apparent from the following description and the appended claims.

BRIEF DESCRIPTION OF THE DRAWINGS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

Embodiments of the present invention are illustrated by way of example, and not by way of limitation, in the figures of the accompanying drawings and in which like reference numerals refer to similar elements.

FIG. 3A illustrates a side view of a record player, in accordance with some embodiments.

FIG. 3B illustrates a side view of a record player, in accordance with some embodiments.

FIG. 4A illustrates a top view of a record player, in accordance with some embodiments.

FIG. 4B illustrates a bottom view of a record player, in accordance with some embodiments.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Various embodiments of the inventions described herein provide for reading records using non-conventional record players. Typically, in conventional record players, a user places a record on a turntable, and that record is read by a needle connected to an arm as it rotates. Typically, a needle includes a stylus, which may be made of diamond. For the purposes of this application, a needle and a stylus may be used interchangeably. In conventional record players, a record is rotated at a constant speed regardless of the location of the needle (in other words, regardless of whether the needle is toward the inner or outer edge of the record). For example, a record may be rotated at a constant 33⅓ or 45 revolutions per minute (RPM), depending on the intended rotation speed of the record. As a result, the angular velocity of the needle with respect to the record is constant (i.e., 33⅓ or 45 RPM in the preceding examples), meanwhile the linear velocity of the needle with respect to the record is variable based on the radial position of the needle (in other words, as the needle moves toward the center of the record from the outer edge of the record).

Figure 5C:
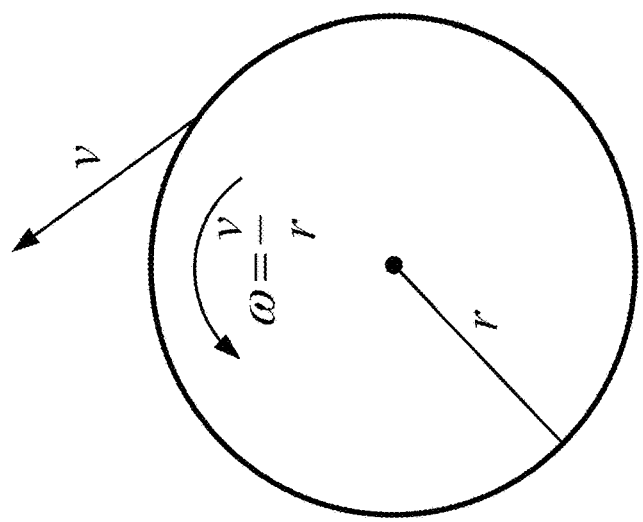
FIG. 5C illustrates the relationship between angular velocity and linear velocity.

FIG. 5C illustrates the relationship between angular velocity and linear velocity. As the radial distance of the needle from the center of the record decreases (i.e., as the radius r' decreases), the linear velocity of the needle (i.e., the linear velocity 'v') must proportionally decrease in order to maintain a constant angular velocity (i.e., 'ω').

Unlike record players that include a turntable, record players described herein can be placed on top of a stationary record (or at least relatively stationary record), and read and play the record by traveling around the stationary record. For example, a record player as described herein may include a body (e.g., a block) including wheels and a needle, and can travel around the surface of a record. The advantages of such a record player are clear. For instance, such a record player may be more portable than a traditional record player with a turntable.

However, the dynamics of a traveling record player are somewhat different from those of a conventional turntable because the record player is moving while the record is stationary. Meanwhile, the needle of a record player that travels around a stationary record may be required to mimic the travel speed of a conventional needle. To accomplish this, the linear travel speed of the record player may be adjusted so as to maintain a constant angular speed of the record player's needle with respect to the stationary record. Accordingly, in one or more embodiments described herein, methods and systems may determine a target linear travel speed of a record player (e.g., a record player capable of traveling around the surface of a stationary record and reading the audio included therein).

When a traveling record player is placed on a record, it has little to no information to use in determining a target linear travel speed. In order to determine a target linear travel speed, one determination the record player may make is its radial position on the record (i.e., its radial distance from the center point of the record). Based on the radial position, the record player may increase/decrease its linear speed (a larger radial distance corresponds with a higher linear speed required to maintain constant angular speed). The record player may make the determination of radial distance based in part on the turn angle of the record player (i.e., a wider turn angle corresponds to a larger distance from the center point, and vice versa).

In order to determine a target linear travel speed, another determination the record player may make is how quickly the record player is gradually spiraling toward the center point of the record. Different records may have different groove spacings (grooves may be also referred to as tracks herein). Specifically, the distance between centers of adjacent grooves (also referred to herein as center-to-center groove spacing, center-to-center groove density, center-to-center track spacing, or center-to-center track density) may vary from record to record. The spacing may vary based on the temporal duration of the record's audio (e.g., longer durations correspond to tighter groove spacing/higher groove density) and/or based on the audio amplitude/frequency which may cause the groove to be more or less wide. In some cases, the center-to-center groove density may vary throughout a single record (e.g., the groove density may increase nearer the center of the record). The record player may more or less rapidly adjust its linear travel speed deceleration based on the how quickly its radial position is decreasing.

Figure 1:
FIG. 1 illustrates a record player, in accordance with some embodiments.

FIG. 1 illustrates a record player 100, in accordance with some embodiments. In one or more embodiments, example record player 100 may sit or be placed, at least in part, on a record 110. In various embodiments, record player 100 may travel/rotate around record 110 (e.g., when a motor propels wheels that cause record player 100 to move).

Figure 2:
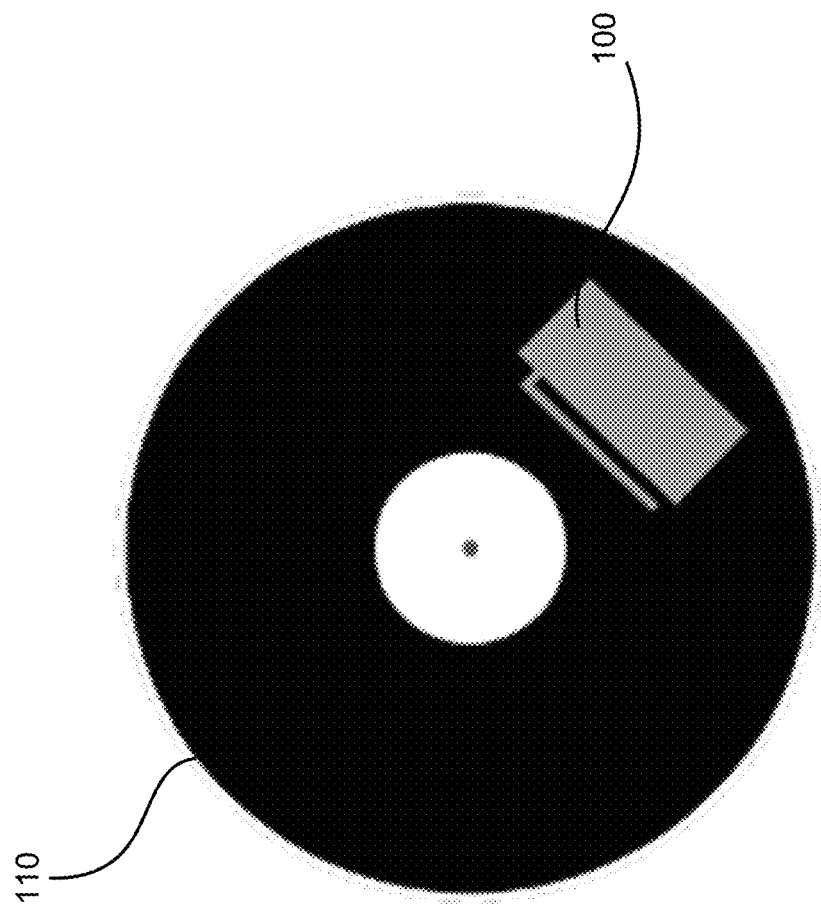
FIG. 2 illustrates a record player, in accordance with some embodiments.

FIG. 2 illustrates a record player 100, in accordance with some embodiments. In one or more embodiments, record player 100 travels/rotates around record 110.

FIG. 3A illustrates a side view of a record player 100, in accordance with some embodiments. Record player 100 includes a switch 120, and wheels 130 and 134. In some embodiments, when switch 120 is in an upward position, record player 100 will move and/or read audio included in a record.

In some embodiments, as shown in FIG. 3B (which illustrates a side view of record player 100, in accordance with some embodiments), a user's hand 305 may be used to push switch 320 down. Switch 320 may be configured this way such that user's hand 305 may easily stop record player 300 from moving without scratching a record.

FIG. 4A illustrates a top view of a record player 100, in accordance with some embodiments. In one or more embodiments, record player 100 includes a switch 320, which may cause record player 100 to begin or stop traveling around a record.

FIG. 4B illustrates a bottom view of a record player 100, in accordance with some embodiments. In one or more embodiments, record player 100 includes a switch 320, which may cause record player 100 to begin, or stop, traveling around a record. In some embodiments, a position of switch 320 may indicate an intended rotational speed of a record, and thereby also the speed (e.g., angular velocity) of a record player. For example, different positions of switch 320 may correspond to a record meant to be read at 33⅓ RPM, 45 RPM, 78 RPM, or any other speed.

FIG. 4B also includes wheels 330 and 432, which may be in contact with a record. In one or more embodiments, only wheels and a needle 454 contact a record. In one or more embodiments, a needle assembly 450 may be included in record player 100 (which is typically located at the end of a tonearm in a conventional turntable-style record player). In one or more embodiments, needle assembly 450 may include a needle cartridge receptacle operable to receive a needle cartridge 452. In one or more embodiments, needle cartridge 452 may include a needle 454. Needle cartridge 452 may be a P-Mount cartridge. While some figures within this application may not show a needle 454 or a needle cartridge 452 within a needle assembly 450, one skilled in the art would understand that the needle assemblies 450 described herein may include needle cartridges 452 and/or needles 454.

In one or more embodiments, a switch 435 indicating a desired/target speed of a record player is included on the bottom of record player 100. In some embodiments switch 435 may turn record player 100 on or off.

In one or more embodiments, a user may select an intended speed with switch 435. For example, a user may move a switch such that the intended speed is 33 and ⅓ RPM or 45 RPM. Since a record player 100 may travel too fast or too slowly as it moves around the top of a record 110, record player 100 may travel faster, or slower (e.g., achieve a target speed), based on its position on a record 110 in order to play the record 100 at its intended speed.

Figure 5B:
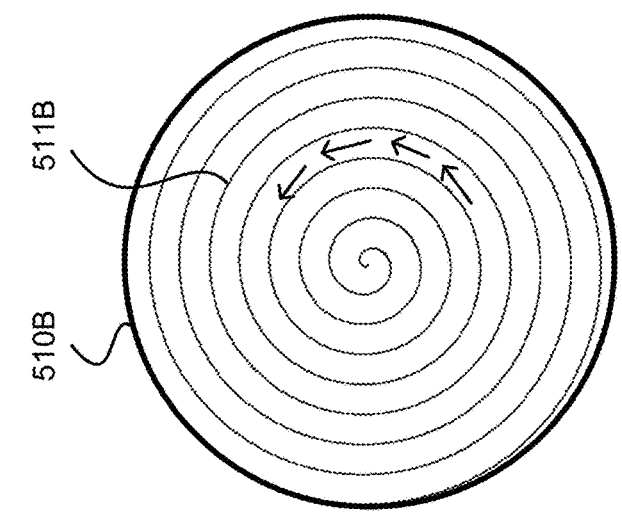
FIG. 5B illustrates a record, in accordance with some embodiments.
Figure 5A:
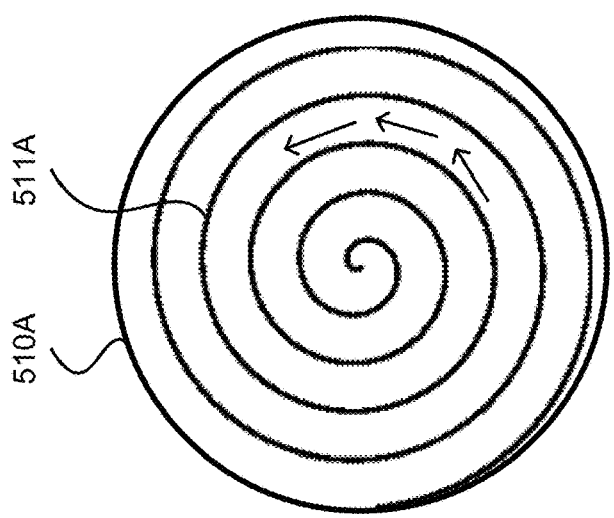
FIG. 5A illustrates a record, in accordance with some embodiments.

FIGS. 5A and 5B illustrate records 510A and 510B, respectively. In one or more embodiments, records 510A and 510B include grooves 511A and 511B, respectively.

Herein, a groove may describe an area within which a needle 454 travels. Records may have grooves that include recorded audio, and these grooves may form a spiral which causes a needle to travel closer to the center of a record 510A or 510B as it reads audio data from a record 510A or 510B. In one or more embodiments, a groove 511A or 511B may be referred to in the plural as grooves 511A or 511B, since the spiral made by the groove 511A or 511B may resemble concentric circles. Also, referring to a groove 511A and 511B that is shaped like a spiral as grooves 511A and 511B helps one skilled in the art differentiate between different locations on a record 510A or 510B. In other words, although a record 510A or 510B technically has one spiral groove 511A and 511B, that groove 511A and 511B may be referred to herein as grooves 311A or 311B for the ease of reading this patent application.

In one or more embodiments, a record 510B may include a longer groove 511B length which may include more audio data (e.g., a longer temporal duration of audio) than a record 510A including a shorter groove 511A length. When a record includes a tighter groove 511B, a record player 100 may gradually adjust its linear travel speed to achieve and maintain an intended angular speed (e.g., to play a record as it would sound on a conventional record player such as 33⅓ RPM or 45 RPM). In one or more embodiments, this linear travel speed may be referred to herein as a target speed.

To determine a target speed, which may be necessary for a record player 100 to achieve an intended angular speed, inputs may be received and processed by a microprocessor (e.g., a microcontroller or "MCU"). In one or more embodiments, these inputs may include: (1) a pivot angle of a needle assembly 450; and (2) an amount and/or direction of force on the record player 100 (e.g., measured by a gyroscope). These inputs may provide information to a record player 100 (e.g., an MCU of the record player) to determine its position on a record (e.g., innermost, outermost, or any groove in between) based on the turn angle of the record player 100, and the current groove spacing (i.e., groove center to consecutive groove center distance), and thus aid the record player 100 in determining a target speed (and/or an acceleration rate).

In one or more embodiments, a pivot angle (e.g., of the needle assembly 450) may be determined by an intensity of infrared light 1385 (of FIG. 13) received at an infrared receiver/sensor 1380 (of FIG. 13) (where the light emitted by an infrared emitter is variably blocked by a light gate). In one or more embodiments, a pivot angle (e.g., of the needle assembly 450) may be determined by a potentiometer or variable resistor. The pivot angle may correspond to the turn angle of the record player 100.

Further, in one or more embodiments, output/measurements from infrared receiver 1380 and a gyroscope may be communicated to a microprocessor as input information, such that the microprocessor may cause the record player 100 to travel at a target speed. In some embodiments, instead of or in addition to infrared light, other wavelengths may be used (i.e., emitted and received) such as visible light and/or ultraviolet light. One advantage of using infrared light is that ambient visible spectrum light will not interfere with the accuracy or precision of the received light intensity measurement.

As should be understood, a pivot angle of a needle assembly 450 may provide a record player with a current turn/rotation angle of a record player 100 relative to a record 510A or 510B, but in some embodiments this angle alone may not provide enough information to determine a location of a record player 100 on a record 510A or 510B (e.g., because only using a pivot angle may not account for records with groove spirals that are more or less spaced from one another). Thus, an amount and/or direction of force applied to the record player 100 (which may be used to determine start/stop positions for temporal duration measurement on a record) may be used in conjunction with a pivot angle of a needle assembly 450 to determine a target speed.

In one or more embodiments, an amount and/or direction of force applied to the record player 100 (e.g., measured by a gyroscope) may correspond to an amount of tightness of the spirals formed by grooves 511A or 511B and/or a position of the record player 100 on a record (e.g., at which angular coordinate, polar angle, or azimuth). In some embodiments, this force may represent a rate of change of a pivot angle of a needle assembly 450 (e.g., the force may indicate how tight a spiral is formed by 511A or 511B—which may be used to determine a record player's 100 location on a record 511A or 511B).

In one or more embodiments, when determining a target linear travel speed, more or less weight may be placed on a pivot angle of a needle assembly 450 than the input from the gyroscope.

In one or more embodiments, equations used to determine a target speed of a record player 100 may be modified by adjusting an amount of time an input is received/sampled. For example, in some embodiments an intensity of an infrared light 1385 may be (1) read by an infrared receiver 1380 constantly or near-constantly, and/or (2) used in computations by a microprocessor constantly or near-constantly. Similarly, an amount and/or direction of force applied to the record player 100 may be used in computations by a microprocessor constantly or near-constantly. It should be understood that in one or more embodiments, an amount and/or direction of force applied to the record player 100 may be processed by a microprocessor every $\frac{1}{5}^{th}$ of a second. In some cases, an amount and/or direction of force applied to the record player 100 may be processed by a microprocessor every $\frac{1}{10}^{th}$ of a second, which may result in a reading that causes a determination of a target speed of a record player 100 to be more accurate (e.g., read/play the record at its intended speed). Of course, in various embodiments, various inputs, such as a pivot angle of a needle assembly 450 or force applied to the record player 100, may have weights applied to them (or a sampling rate) that are above or below a particular threshold, dynamically determined (e.g., based on a type of record 511A or 511B, a location of a record player 100 on a record 511A or 511B, etc.), statically configured, and/or determined by an attribute of a record 511A or 511B such as its size, intended angular rotation speed, and/or an indicator such as a code (e.g., barcode or QR code).

In one or more embodiments, this average amount of time may be used to determine a target speed of a record player 100 and/or a location of the record player 100 relative to a record 110.

For example, an average amount of time that it takes a record player 100 to travel around a record 110 may be determined by determining an amount of time it takes the record player 100 to travel around the record 110 once and an amount of time it takes the record player 100 to travel around the record 110 a second time. For typical records, the length of the groove 311A or 311B of the record player traveled around the second time is less than the length the groove 311A or 311B the record player 100 traveled around the first time. As one skilled in the art would understand, this second groove 311A or 311B (also referred to as a groove portion) may be shorter than a first groove portion 311A or 311B because of the spiraling nature of record grooves 311A or 311B.

In one or more embodiments, determining an average amount of time it takes for a record player 100 to rotate around the record 110 once (e.g., travel along a first groove, or travel along a first portion of a groove), may include measuring the time elapsed when the record player 100 travels between a first angular position and a second angular position with respect to the center point of the record 110, much like measuring start (i.e., first angular position) and stop (i.e., second angular position) positions of a track and field runner with a stopwatch.

For example, the first and second angular positions may be the same (e.g., at 0 degrees or "3 o'clock"). In some embodiments, if the first and second angular positions are the same, the elapsed time may represent the time it takes to complete one revolution around the record 110 by the record player 100. In some embodiments, while the first and second angular positions are the same, the elapsed time may represent the time it takes to complete two or more rotations (3, 4, and so on) around the record 110 by the record player 100.

In another example, the first and second angular positions may be different (e.g., the first at 0 degrees or "3 o'clock" and the second at 90 degrees or "12 o'clock"). In some embodiments, if the first and second angular positions are different, the elapsed time may represent the time it takes to complete less than one revolution around the record 110 by the record player 100 (e.g., a quarter revolution). In some embodiments, while the first and second angular positions are different, the elapsed time may represent the time it takes to complete more than one rotation (e.g., 1.25, 2.25, and so on) around the record 110 by the record player 100.

In some embodiments, the portions between the first and second angular positions may be the same between multiple duration measurements. For example, a first time measurement between 0-90 degrees, and a second time measurement between 0-90 degrees once the record player has completed a rotation to return to the 0 degree position. In some embodiments, the portions between the first and second angular positions may be different but contiguous between multiple duration measurements. For example, a first time measurement between 0-90 degrees and a second time measurement between 90-180 degrees. In some embodiments, the portions between the first and second angular positions may be different and non-contiguous between multiple duration measurements. For example, a first time measurement between 0-90 degrees and a second time measurement between 180-270 degrees.

The current angular position of the record player 100 may be determined using the measurements of a gyroscope included in the record player 100. For example, the gyroscope may provide measured force magnitude and force direction information to the microprocessor. The microprocessor may use this information to determine the first and second (i.e., start and stop) positions of the record player 100, and thereby measure the elapsed time it takes the record player to travel between these points.

In one or more embodiments, the first groove/first portion of the groove is the portion where the record player travels around the record the first time, and the second groove/second portion of the groove is the portion where the record player travels around the record the second time (e.g., to determine a delta/change in time it takes for the record player to travel between the first portion and the second portion of the record, and/or the location of the record player). In one or more embodiments, the amount of time it takes for a record player to complete traversal around a first portion, a second portion, or a time delta between the first and second portion, of a record may be stored in a memory included in the record player (or remotely, such as on a server). Such information may be accessed by a record player at a later time to determine a speed at which to travel.

Figure 6:
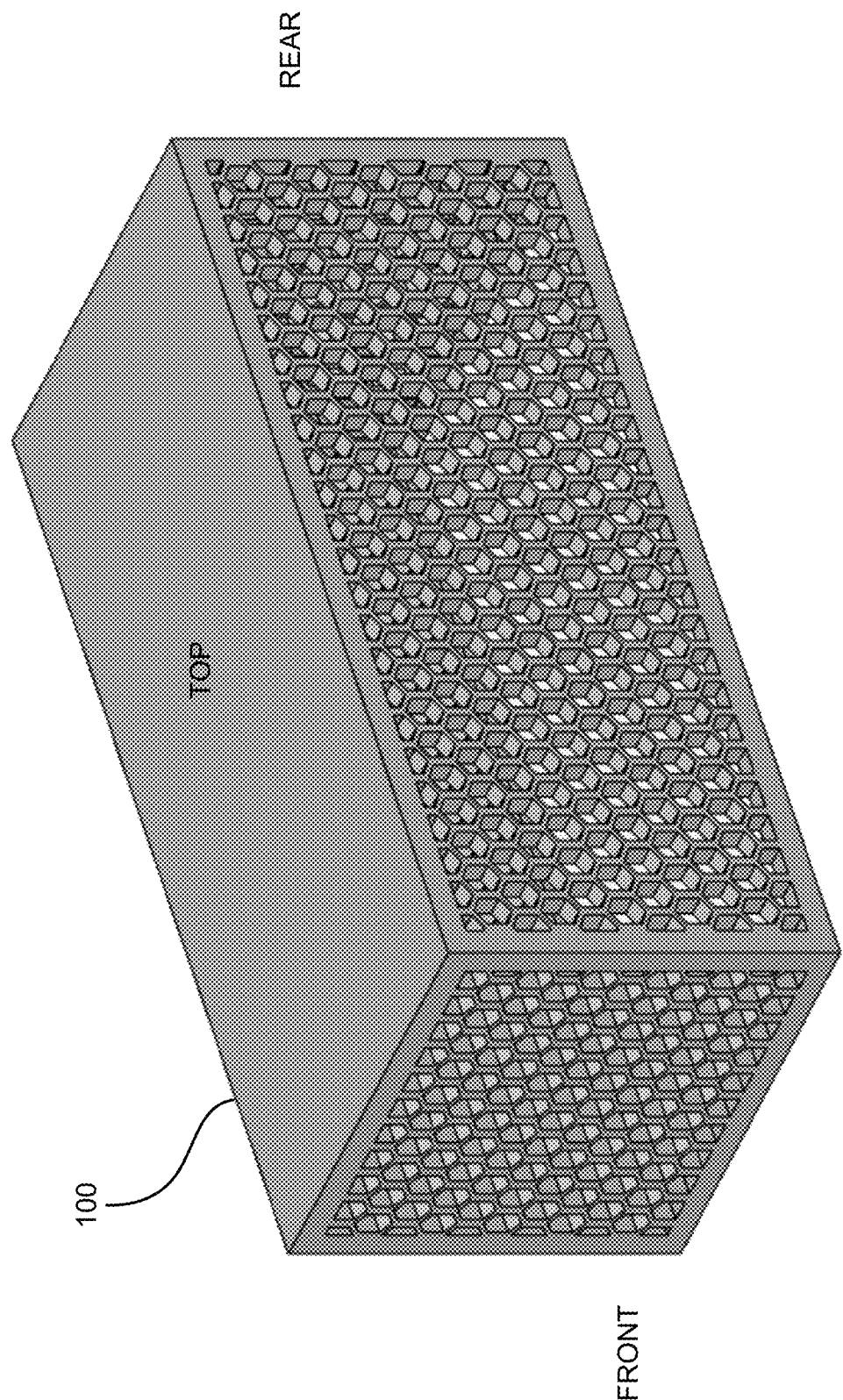
FIG. 6 illustrates an enclosure for a record player, in accordance with some embodiments.

FIG. 6 illustrates an enclosure for a record player 100, in accordance with some embodiments. The enclosure for record player 100 may have sides including a honeycomb pattern. In one or more embodiments, the enclosure for record player 100 may be different shapes, such as a boat, a plane, a car, a Zamboni-like vehicle, or another wheeled vehicle.

Figure 7:
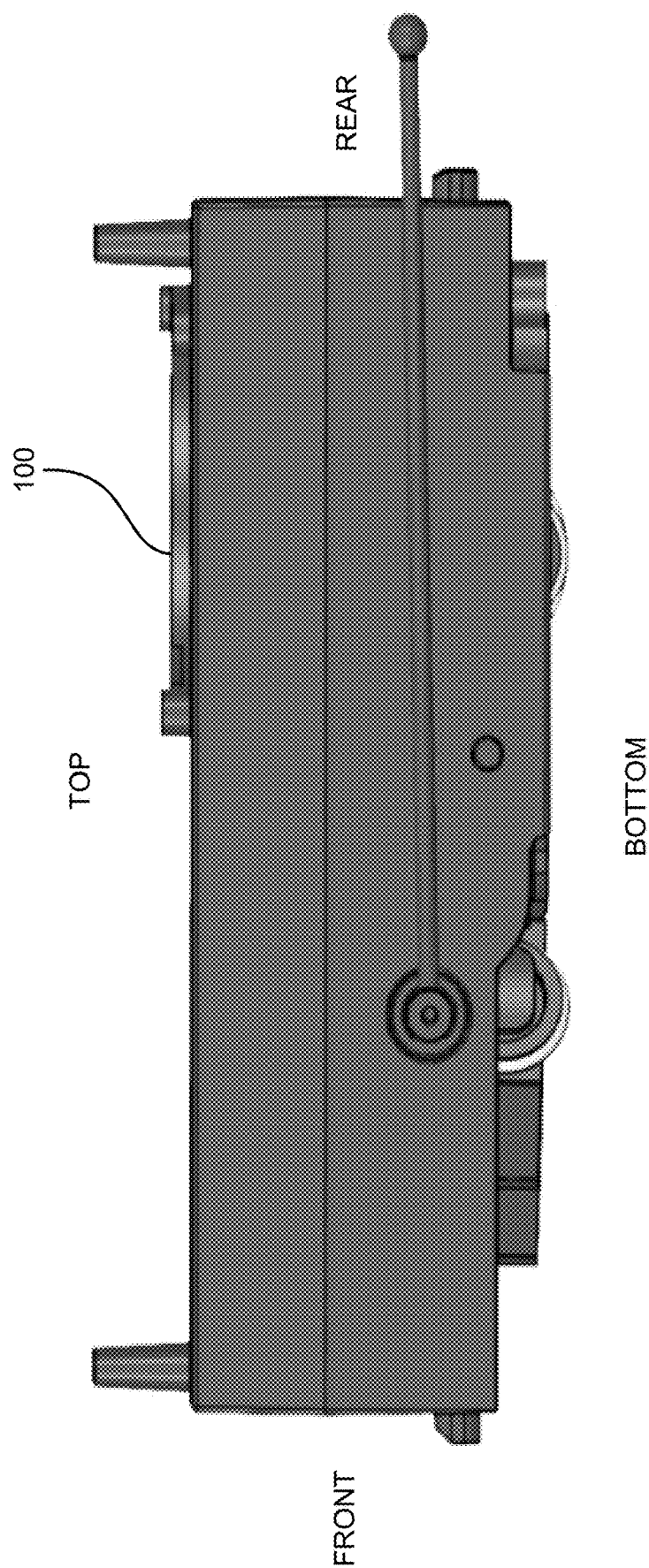
FIG. 7 illustrates a side view of a record player without an enclosure, in accordance with some embodiments.

FIG. 7 illustrates a side view of a record player 100 without an enclosure, in accordance with some embodiments. Record player 100 includes wheels, a switch, and portions that enclose a circuit board.

Figure 8:
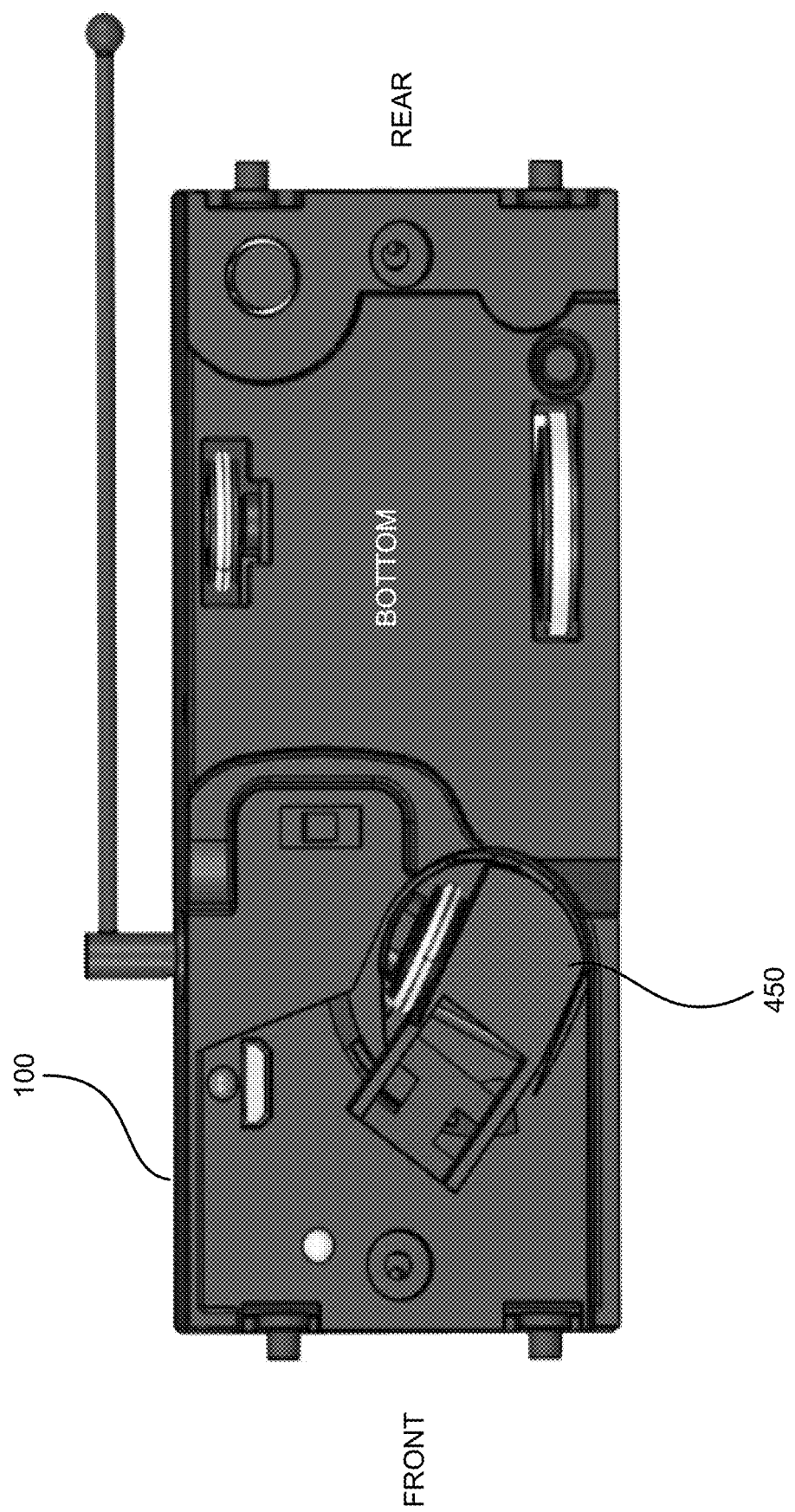
FIG. 8 illustrates a bottom view of a record player, in accordance with some embodiments.

FIG. 8 illustrates a bottom view of a record player 100, in accordance with some embodiments. In one or more embodiments, a bottom of record player 100 may include a needle assembly 450 (here, a needle 454 is not shown within needle assembly 450, as would be understood by one skilled in the art), wheels, and various switches.

Figure 9:
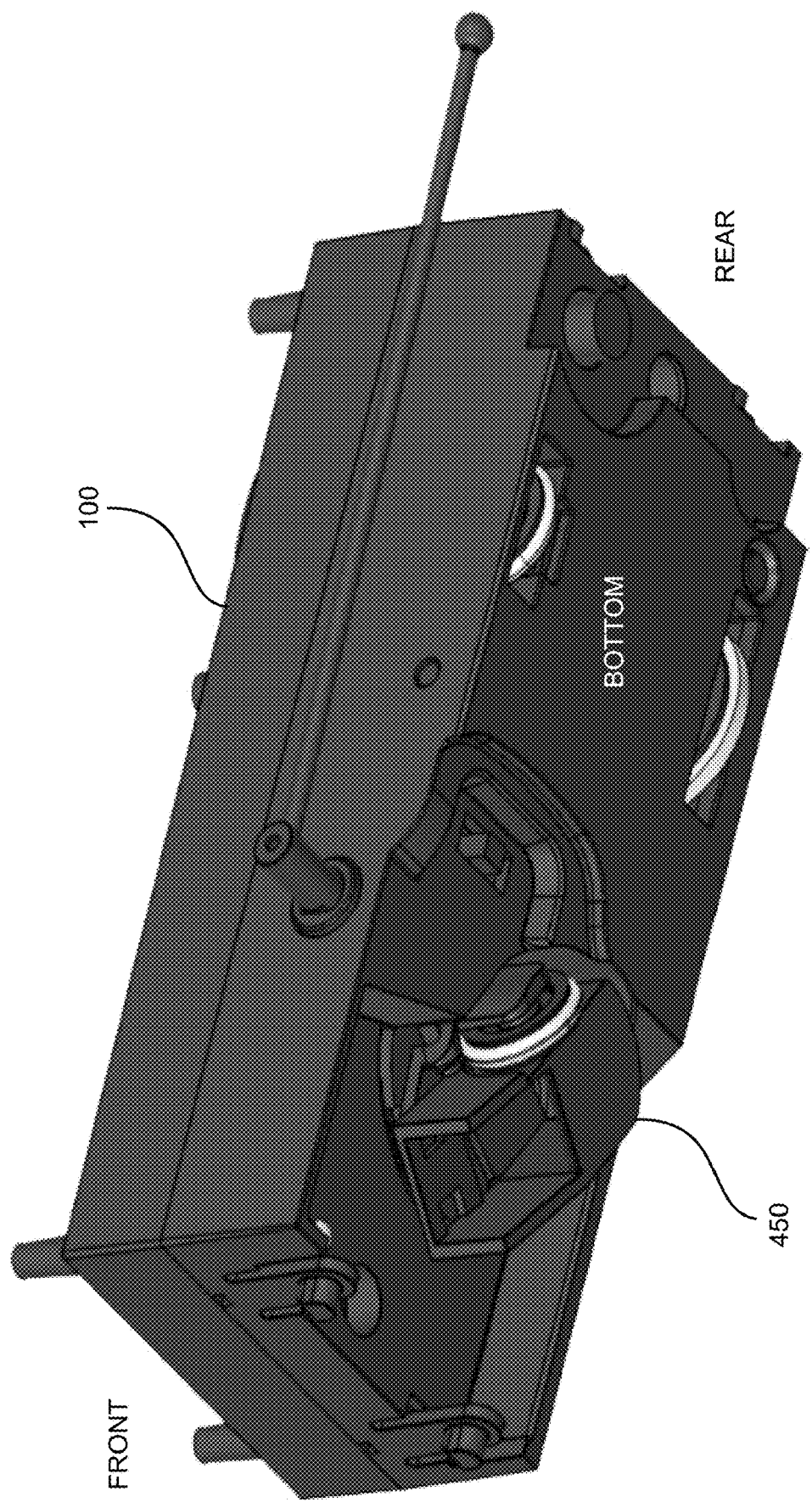
FIG. 9 illustrates an isometric view of a record player, in accordance with some embodiments.

FIG. 9 illustrates an isometric view of a record player 100, in accordance with some embodiments. In one or more embodiments, a record player 100 includes a needle assembly 450, wheels, and various switches.

Figure 10:
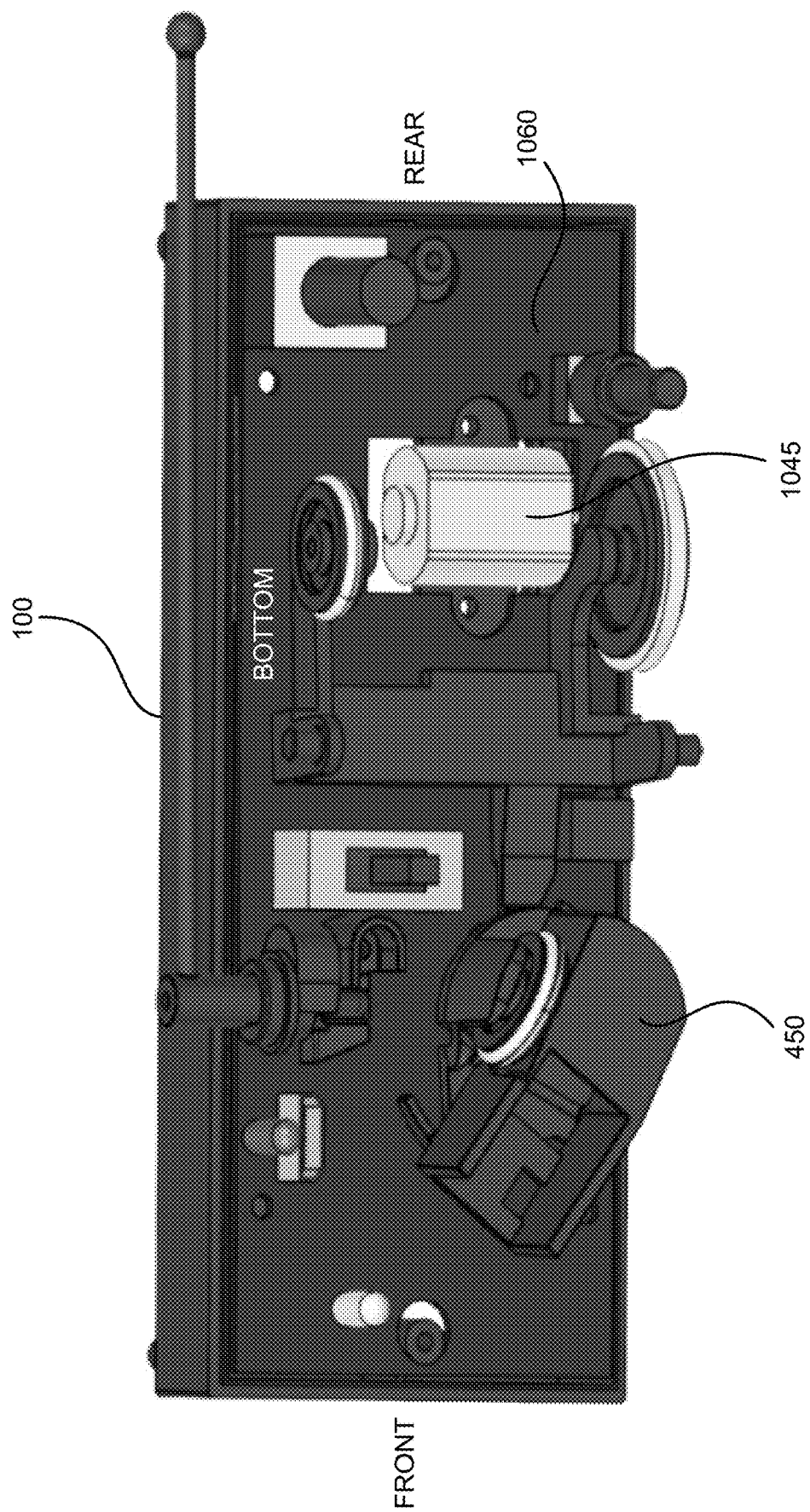
FIG. 10 illustrates a bottom view of a record player, in accordance with some embodiments.

FIG. 10 illustrates a bottom view of a record player 100, in accordance with some embodiments. In one or more embodiments, record player 100 includes a needle assembly 450, a motor 1045, and a circuit board 1060. In one or more embodiments, motor 1045 may be provided power that causes the wheels to turn at a particular speed, which may cause record player 100 to travel around a record at a certain speed. In one or more embodiments, a circuit board 1060 may include traces and components which may transmit signals or actuate elements of record player 100. For example, circuit board 1060 may be attached to an infrared emitter 1490 (of FIG. 14), an infrared receiver 1380, and one or more switches 435.

Figure 11:
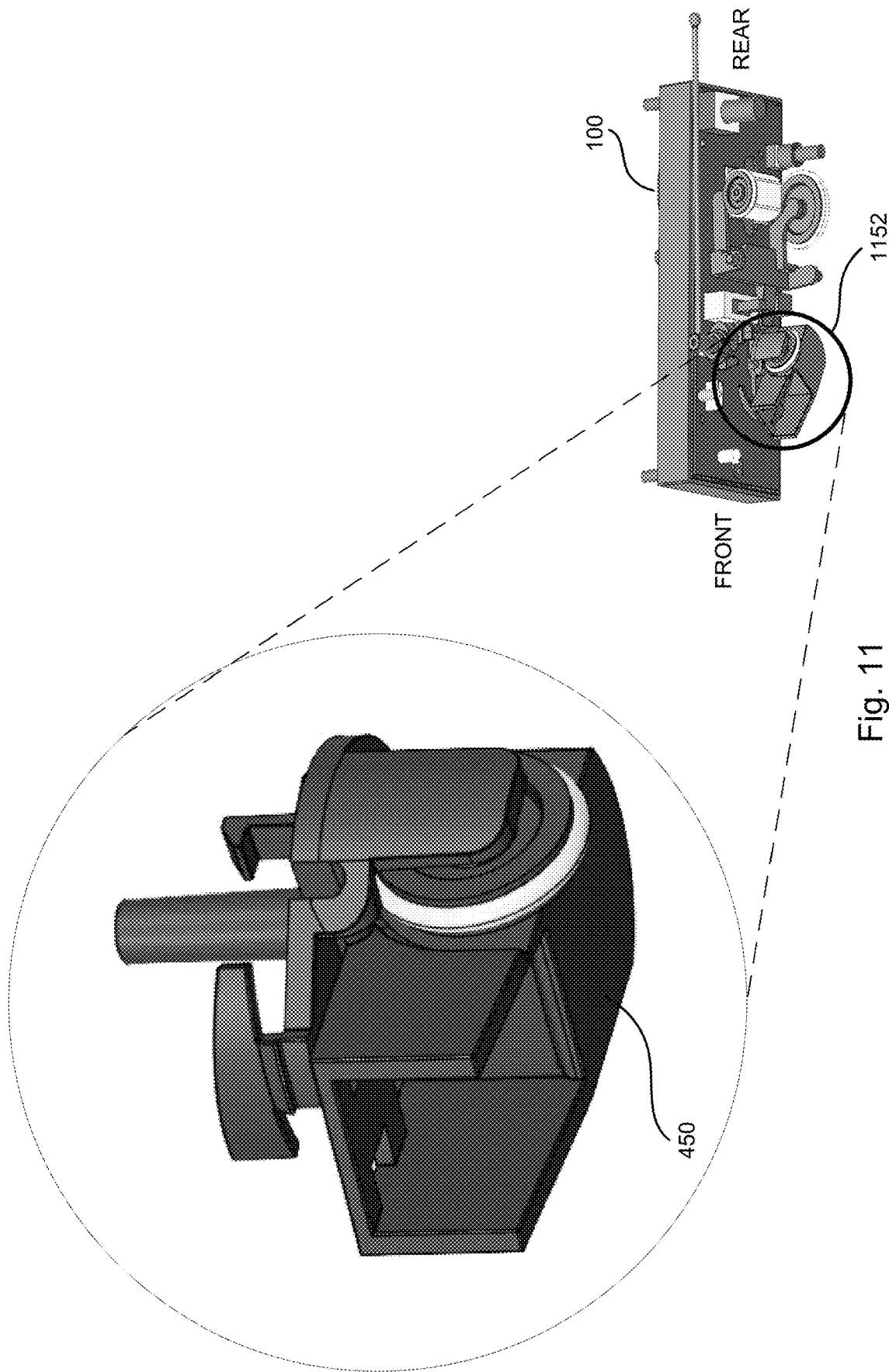
FIG. 11 illustrates a blown-out view of a needle assembly, in accordance with some embodiments.

FIG. 11 illustrates a blown-out view of a needle assembly 450, in accordance with some embodiments. Here, as an example, needle assembly 450 is located within record player 100 within region 1152. Needle assembly 450 may include a wheel, which may be surrounded by a soft material such as nylon or rubber.

Figure 12:
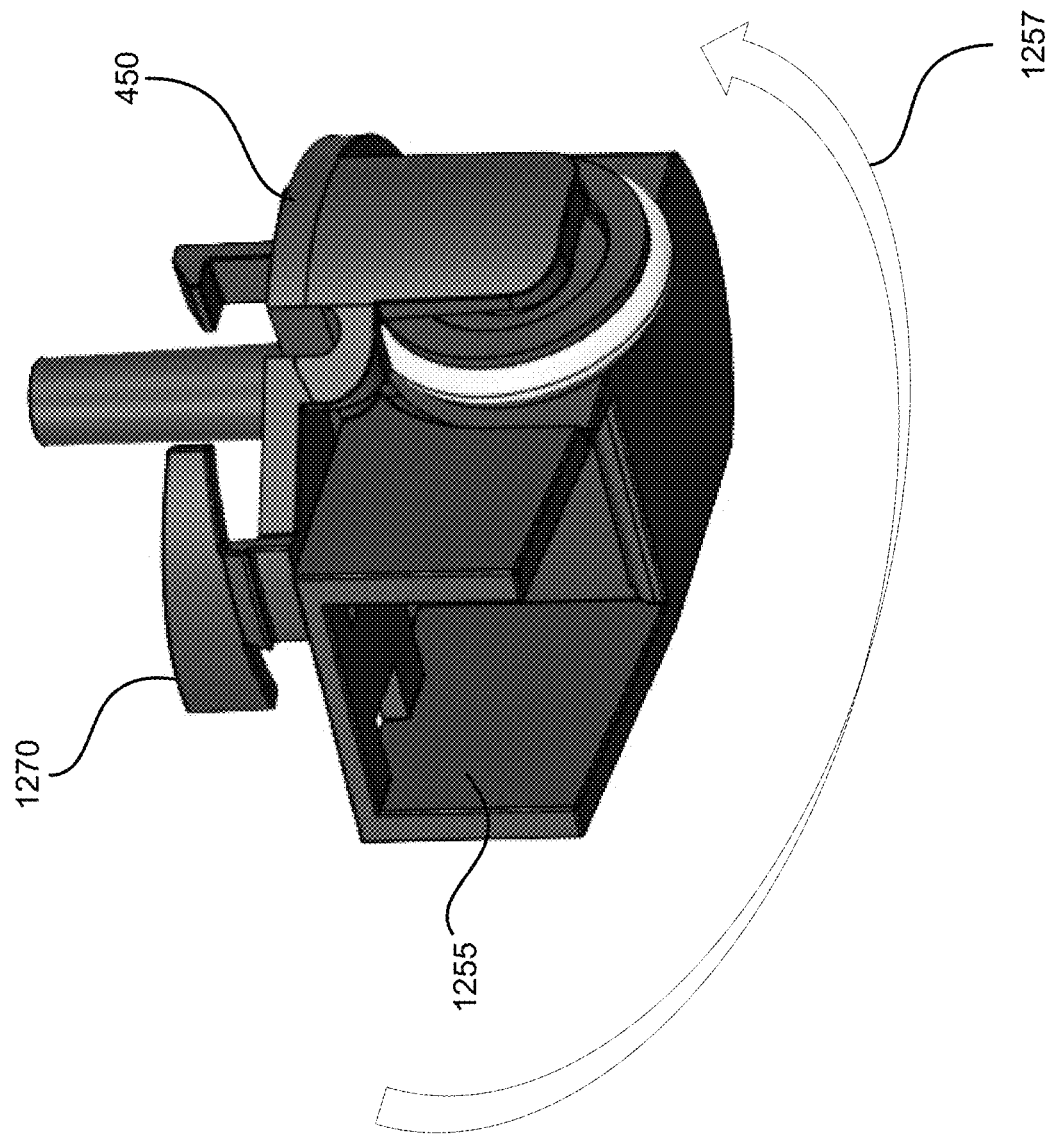
FIG. 12 illustrates a needle assembly, in accordance with some embodiments.

FIG. 12 illustrates the needle assembly 450, in accordance with some embodiments. In one or more embodiments, needle assembly 450 may include an area 1255 for a needle cartridge (e.g., a P-Mount cartridge) to be inserted. In one or more embodiments a gate 1270 may be connected (permanently or detachably) to needle assembly 450. In one or more embodiments, gate 1270 may be taller/longer/wider/thicker on one end than the other (whether the term taller, longer, wider, or thicker should be used may be determined by anyone of skill in the art). In one or more embodiments, gate 1270 may have gradual increasing or decreasing opacity (or translucency) across a portion of the gate 1270, such that different regions of the portion allow the passage of more or less light. In one or more embodiments, a needle assembly 450 moves/rotates in direction 1257 (which may be caused by a record player rotating around a record), a pivot angle of needle assembly 450 changes an intensity of light received by an infrared receiver 1380 because gate 1270 blocks more or less light being transferred from an infrared emitter 1490 to an infrared receiver 1380 as it rotates (as will be described in additional detail with respect to FIGS. 13 and 14).

Figure 13:
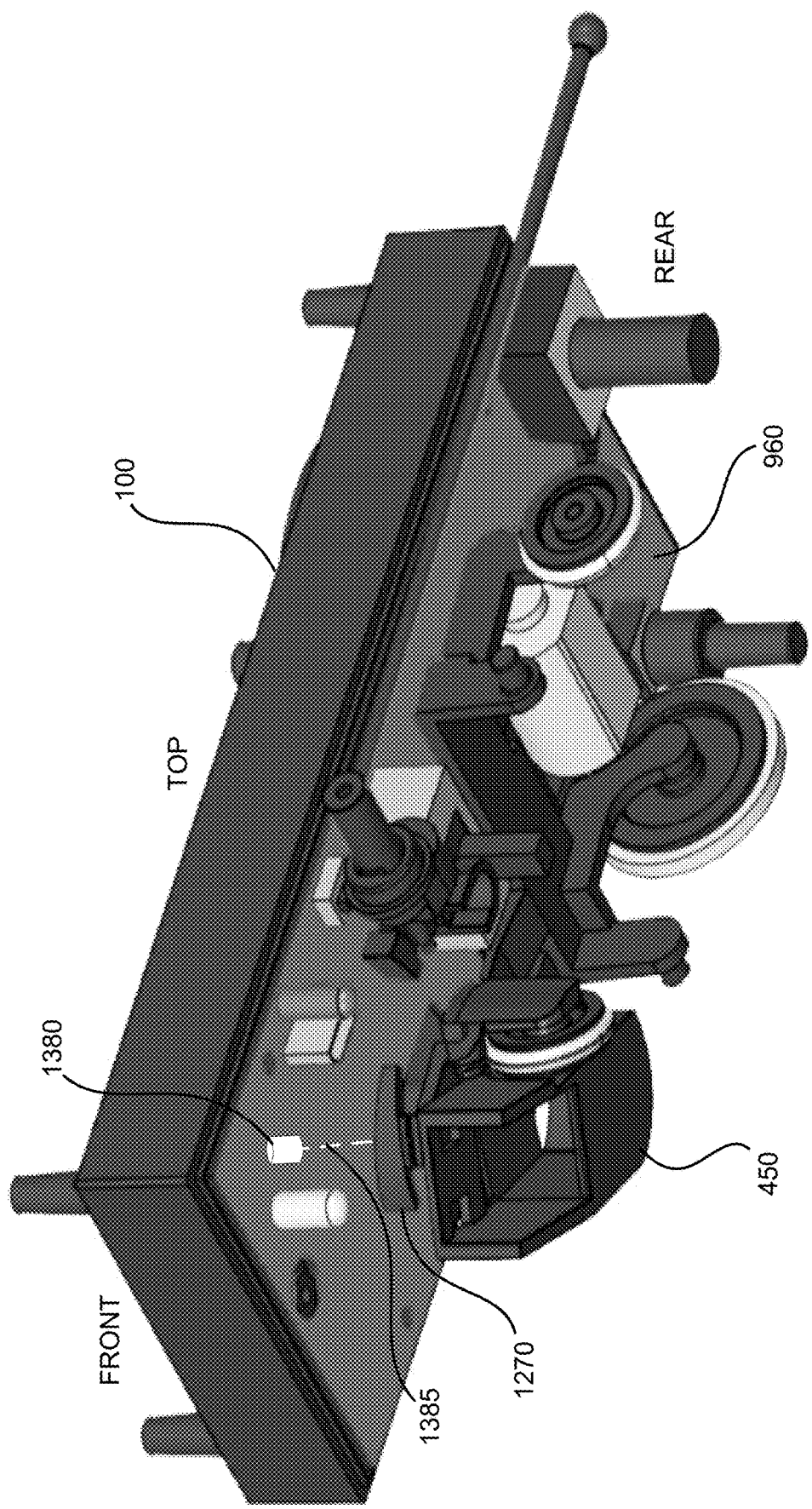
FIG. 13 illustrates an isometric view of a record player, in accordance with some embodiments.

FIG. 13 illustrates an isometric view of a record player 100, in accordance with some embodiments. Record player 100 includes a needle assembly 450, a gate 1270, a light receiver 1380, and a depiction of traveling light 1385. As discussed herein, in various embodiments different amounts of light may be received by a light receiver 1380 (infrared receiver 1380) (e.g., infrared, visible spectrum, and/or ultraviolet light) based on a location/pivot angle of gate 1270. For example, when a bigger/taller/longer/wider/thicker (or more opaque) portion of gate 1270 is blocking an infrared emitter 1490, less intense light may reach an infrared receiver 1380 than when a smaller/shorter/thinner (or more translucent) portion of gate 1270 is blocking infrared light. Accordingly, the light intensity received at the infrared receiver 1380 corresponds to a pivot angle of gate 1270, which in turn corresponds to a pivot angle of the needle assembly 450, which in turn corresponds to a turn angle of the record player 100. As a result, the light intensity corresponds to the turn angle of the record player 100. In some embodiments, the turn angle of the record player 100 may be used to determine the radial position of the record player 100 with respect to the center of the record.

In one or more embodiments, the infrared receiver 1380 communicates measured light intensity information to the microprocessor. The light information may be communicated in an analog or digital format. In one or more embodiments, an amount of infrared light received at the infrared receiver, and ultimately at the microprocessor, may be used to cause the record player 100 to travel at a target speed.

Figure 14:
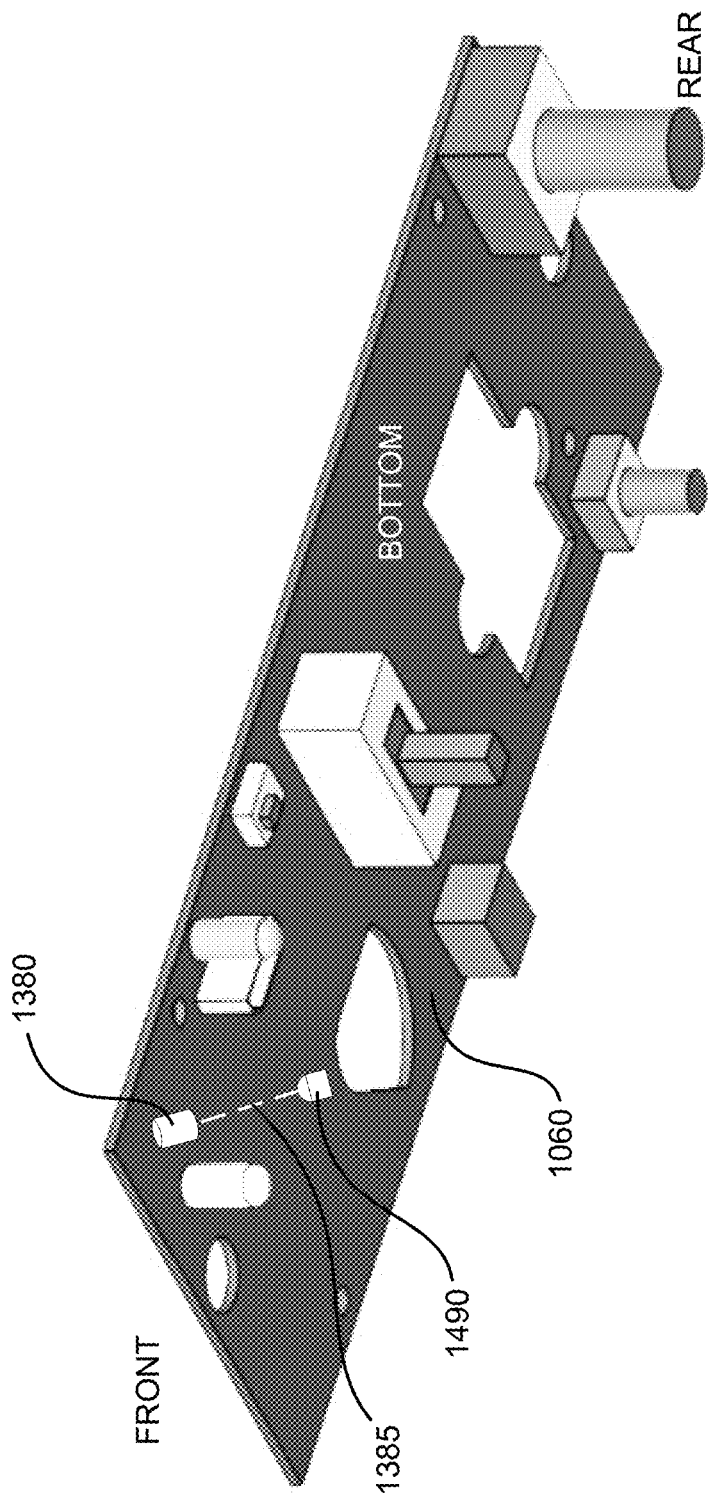
FIG. 14 illustrates a circuit board, in accordance with some embodiments.

FIG. 14 illustrates a circuit board 1060, in accordance with some embodiments. In one or more embodiments, the portion of circuit board 1060 shown faces a record when a record player 100 including circuit board 1060 is traveling around a record 110. As described above, in one or more embodiments, an infrared transmitter 1490 may transmit light 1385 to a light receiver 1380. As described herein, infrared transmitter 1490 may produce infrared light 1385 that can send audio data (e.g., in the form of light 1385) to infrared receiver 1380.

Figure 15:
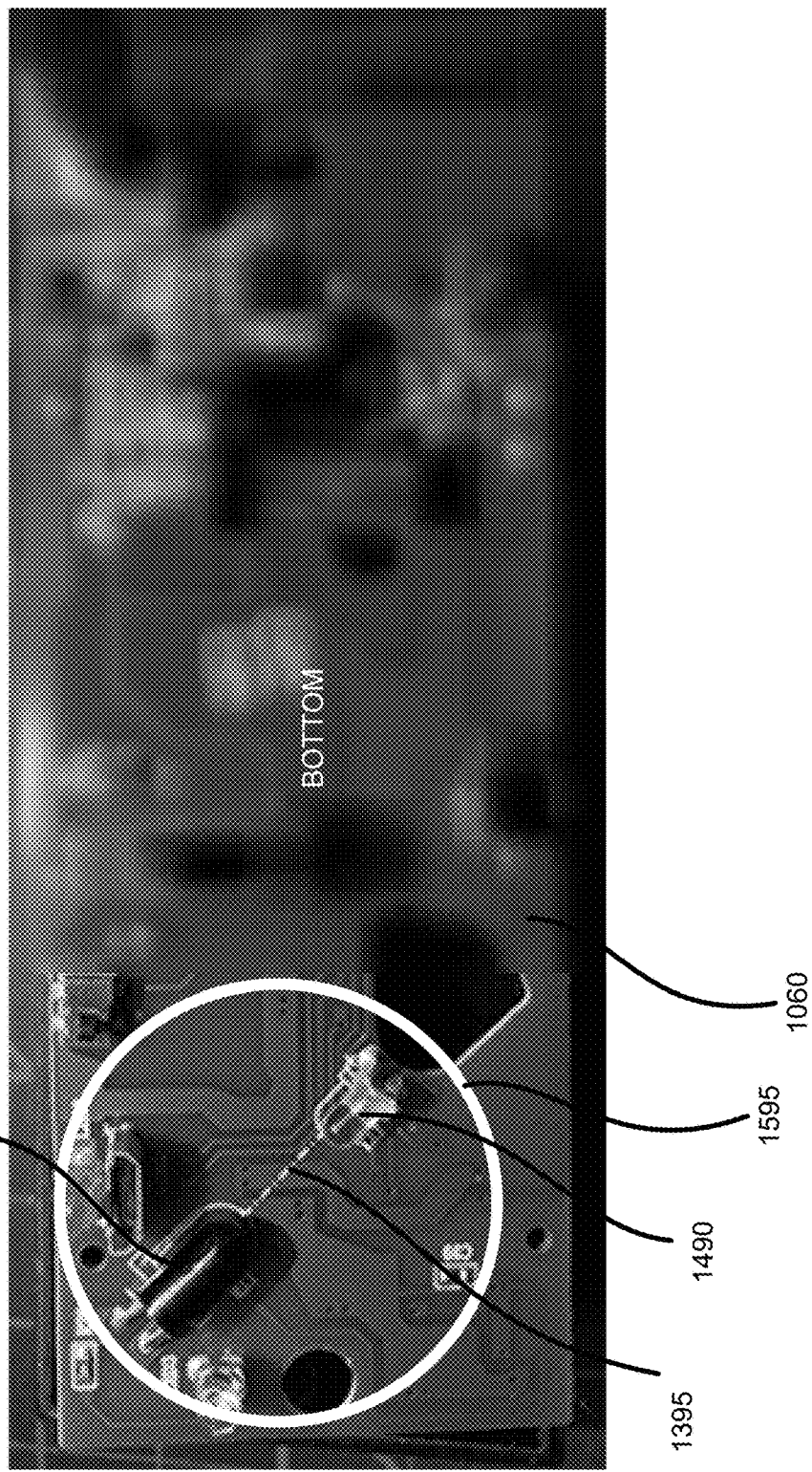
FIG. 15 illustrates a circuit board, in accordance with some embodiments.

FIG. 15 illustrates a circuit board 1060, in accordance with some embodiments. Within region 1595 on example circuit board 1060, light transmitter 1490 is shown directed at light receiver 1380.

Figure 16:
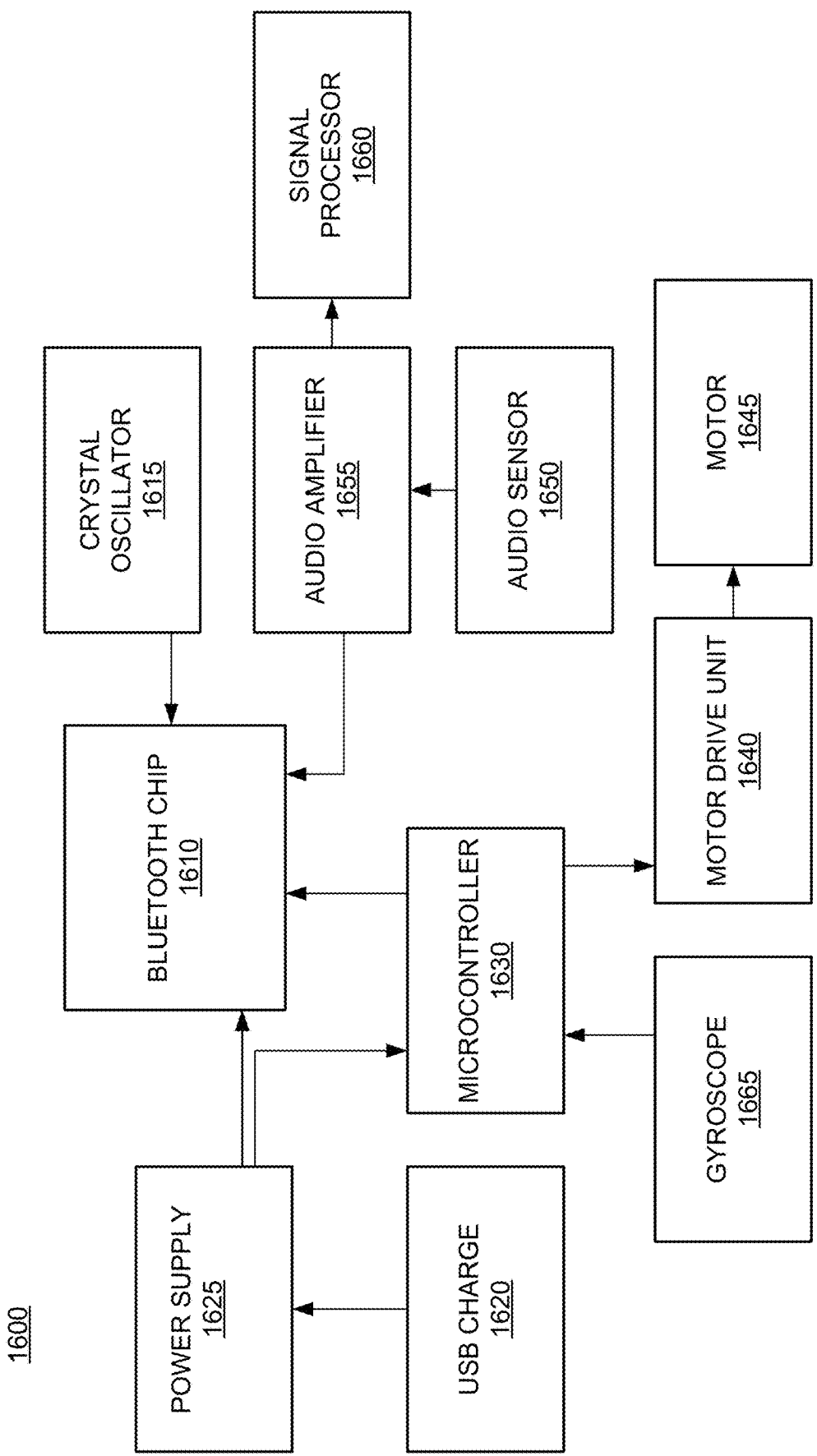
FIG. 16 illustrates a flowchart of a method for reading a record, in accordance with some embodiments.

FIG. 16 illustrates a block diagram 1600 of an example system, in accordance with some embodiments. In one or more embodiments, some, or all, or none of the elements in FIG. 16 may be included in a record player or connectively coupled. In one or more embodiments, block diagram 1600 includes a Bluetooth™ chip 1610, which may be connected to an antenna (not shown). In various embodiments, data received at a record player may be transmitted to a Bluetooth™ receiver and played, for example, at a remote speaker. This may prevent doppler effects which may be created by a moving speaker. It should be understood by one skilled in the art that while Bluetooth™ is used as an example transmission technology and/or protocol herein, other wireless technologies/protocols can be implemented instead of, or in addition to, Bluetooth™ in one or more embodiments. For example, radio frequency (RF) communication technologies, infrared (IR) communication technologies, WiFi, Zigbee, cellular (e.g., 4G, 5G), etc.

In one or more embodiments, a record player 100 may be powered by power supply 1625. Power supply 1625 may be communicatively coupled to Bluetooth™ chip 1610 and/or power Bluetooth™ chip 1610. Power supply 1625 may provide 3.7 volts of direct current, in accordance with one or more embodiments. Further, in one or more embodiments, a record player 100 and/or power supply 1625 may be charged via a charger (e.g., a USB charger 1620, or another type of charger).

In one or more embodiments, audio sensor 1650 may receive readings from a needle 454 as a record player 100 rotates around a record 110. Audio sensor 1650 may transmit audio information, and/or other information such as information that may be used to determine a target speed of a record player 100, to audio amplifier 1655, which in turn transmits information to Bluetooth™ chip 1610. Further, in one or more embodiments, audio amplifier 1655 may transmit audio to a signal processor 1660. Signal processor 1660 may transform audio signals to smooth them, introduce noise, or otherwise change the signals. Such signals, in one or more embodiments, may be provided to an audio output device.

In one or more embodiments, crystal oscillator 1615 may be communicatively coupled to Bluetooth™ chip 1610. Crystal oscillator 1615, in one or more embodiments, crystal oscillator 1615 may operate at 24.00 MHz, and/or at least in part determine/provide a signal that may modify a speed of a record player 100.

In one or more embodiments, Bluetooth™ chip 1610 may be communicatively coupled to microcontroller 1630. Microcontroller 1630 may provide and/or receive (1) data/information and/or (2) instructions to Bluetooth™ chip 1610, motor drive unit 1640, and/or power supply 1625. In one or more embodiments microcontroller 1630 may receive data/information (note that data and information may be used interchangeably) from gyroscope 1665. As described herein, gyroscope 1665 may assist with determining an amount and/or direction of force on the record player 100, and in turn be used by microcontroller 1630 to assist with determining a target speed of a record player 100.

In one or more embodiments, microcontroller 1630 may transmit information to motor drive 1640 unit. Motor drive unit 1640 unit may provide signals to one or more motors 1645. As described herein, motors 1645 may cause wheels on a record player 100 to spin such that the record player 100 achieves a target speed.

Of course, one skilled in the art would understand that this is only an example block diagram 1600 of portions of a record player 100. In one or more embodiments, additional elements may be added to block diagram 1600. Further, elements in block diagram 1600 may be added, and/or connected to one another in a different manner. For example, in some embodiments a crystal oscillator 1615 may provide vibration information directly (e.g., without going through Bluetooth™ chip 1610) to microcontroller 1630, and audio amplifier 1655 may provide audio information directly to microcontroller 1630, such that microcontroller 1630 may determine a target speed.

Figure 17:
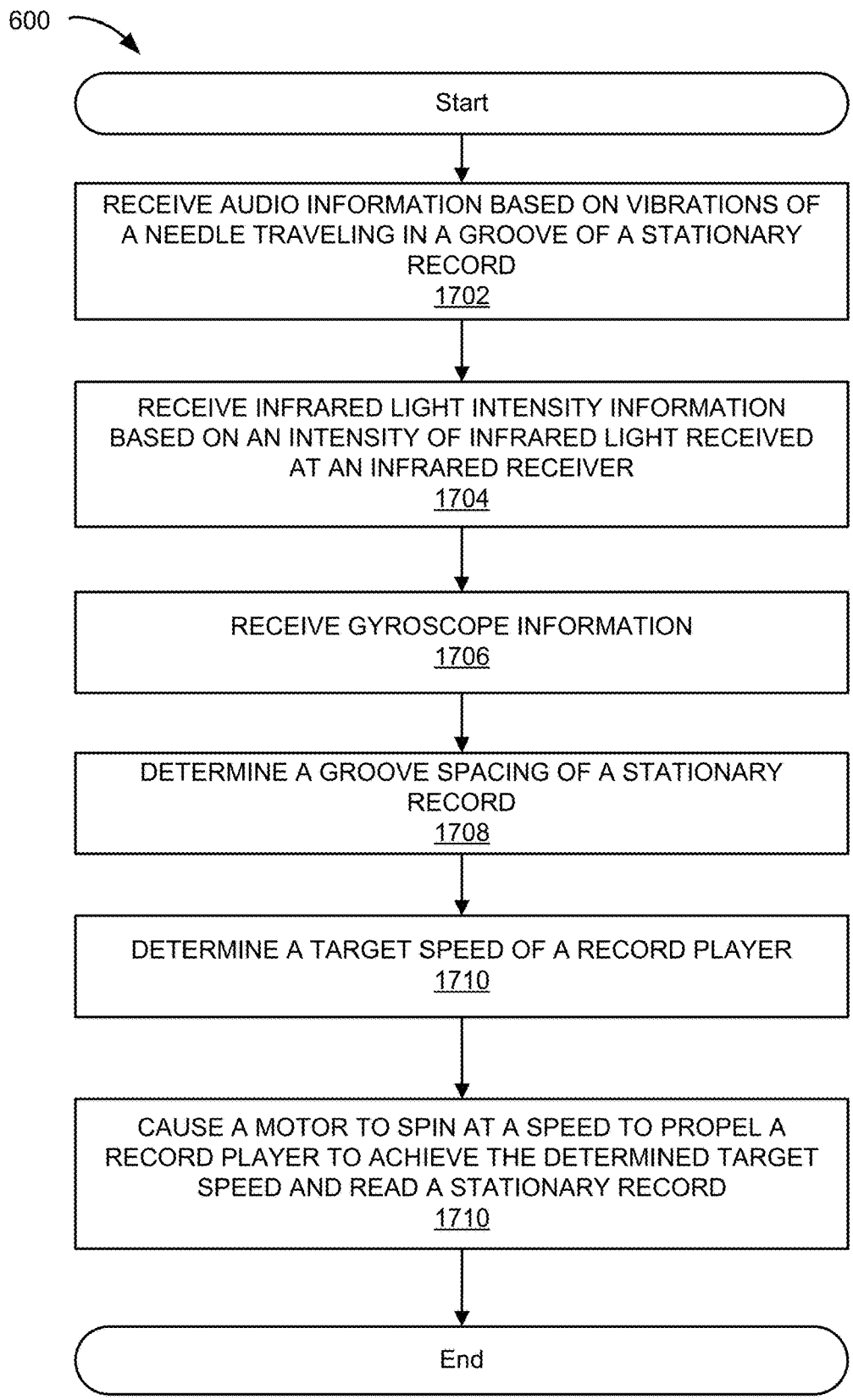
FIG. 17 illustrates a block diagram of an example system, in accordance with some embodiments.

FIG. 17 illustrates a flowchart 1700 of a method for reading a record 110, in accordance with some embodiments. While the various steps in the flowchart are presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 17 should not be construed as limiting the scope of the invention.

In STEP 1702, audio information is received based on vibrations of a needle traveling in a groove of a stationary record. For example, a record player may receive the information. The record player may be located at least in part on top of a stationary record. The record player may include a motor and wheels that enable the record player to travel around a stationary record.

In STEP 1704, infrared light intensity information is received based on intensity of an infrared light received at an infrared receiver. For example, an infrared light may transmit data to an infrared receiver, and some of that light may be blocked by a gate, thereby reducing the infrared light's intensity when it reaches the infrared receiver. The infrared light intensity may be used to determine a turn angle of the record player.

In STEP 1706, gyroscope information is received. Gyroscope information may be based on an amount of force experienced by the record player. For example, as a record player travels around a record, gyroscope information about the record player's angular positions at different times is received.

In STEP 1708, a groove spacing of a stationary record is determined. For example, the groove spacing may be determined based on the amount of time elapsed between two angular positions of the record player, or based on a delta time value between two angular traversals by the record player.

In STEP 1710, a target speed of a record player is determined. The target speed of the record player may be determined based at least in part on the (current) turn angle of the record player and/or the (current) groove spacing.

In STEP 1712, a motor is caused to spin at a speed to propel a record player to achieve a determined target speed and read a stationary record. For example, one or more motors may be powered by batteries, and the one or more motors may cause the one or more wheels to cause the record player to move at a determined speed such that the record player can create sound (e.g., via a speaker) or transmit signals (e.g., to a Bluetooth™ speaker or the cloud) as intended by the encoded audio. For example, the speed may be such that the audio sounds as if it were being played on a typical record player including a turntable with a stationary needle.

Embodiments described herein may be discussed in the general context of computer-executable instructions residing on some form of computer-readable storage medium, such as program modules, executed by one or more computers, microcontrollers (e.g., microcontroller 1630), and/or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

In one or more embodiments, a method for reading a stationary record includes receiving, by a record player, audio information based on vibrations of a needle traveling in a groove of the stationary record, wherein the record player is located at least in part on top of the stationary record, and wherein the record player includes a motor and wheels that enable the record player to travel around the stationary record; receiving infrared light intensity information based on an intensity of infrared light received at an infrared receiver, wherein the infrared receiver receives the infrared light from an infrared emitter, and wherein the infrared emitter and the infrared receiver are included in the record player; receiving gyroscope information, wherein the gyroscope information is based on an amount of force experienced by the needle, and wherein the gyroscope information is generated by a gyroscope included in the record player; determining a width of the groove of the stationary record, wherein the width of the groove of the stationary record is determined based on the received infrared light intensity information and the received gyroscope information; determining a desired speed of the record player, wherein the desired speed of the record player changes based on the width of the groove of the stationary record that the needle is traveling in; and causing the motor to spin at a speed to propel the record player to achieve the determined desired speed and read the stationary record.

In one or more embodiments, the method further comprises: receiving data via the infrared light at the infrared receiver, wherein the determined width of the groove of the stationary record is also determined based on the received data. In one or more embodiments, the method further comprises: decreasing the intensity of the infrared light in response to the record player traveling around the stationary record. In one or more embodiments, the method further comprises: blocking, by a gate included in a needle assembly, an amount of light generated by the infrared emitter, wherein the needle is included in the needle assembly, and wherein the intensity of the infrared light is decreased in response to an increase in the blocked amount of light. In one or more embodiments, the blocked amount of light increases based on a pivot angle of the needle assembly. In one or more embodiments, the method further comprises decreasing an intensity of the infrared light in response to a gate included in a needle assembly blocking an amount of light received by the infrared receiver, wherein the needle is included in the needle assembly. In one or more embodiments, the method further comprises determining the location of the record player in relation to the stationary record, wherein the determined desired speed of the record player is also based on the location of the record player in relation to the stationary record. In one or more embodiments, the method further comprises: determining an average amount of time that the record player travels around the stationary record based on the gyroscope information and an amount of pivot of a needle assembly, wherein the needle assembly includes the needle, and wherein determined desired speed of the record player is also based on the average amount of time that the record player travels around the stationary record. In one or more embodiments, the method further comprises determining an amount of time it takes the record player to make a first rotation around the stationary record; and determining an amount of time it takes the record player to make a second rotation around the stationary record, wherein the average amount of time that the record player travels around the stationary record is based on the amount of time it takes the record player to make the first rotation around the stationary record and the amount of time it takes the record player to make the second rotation around the stationary record. In one or more embodiments, the first rotation around the stationary record comprises the needle traveling in a first portion of the groove, wherein the second rotation around the stationary record comprises the needle traveling in a second portion of the groove, and wherein the first portion of the groove abuts the second portion of the groove, and wherein the record player makes two rotations around the stationary record to cause the needle to travel through the first portion of the groove and the second portion of the groove. In one or more embodiments, the method further comprises: storing, in a memory unit, an amount of time it takes for the record player to complete a revolution around the stationary record, wherein the determined desired speed of the record player is also based on the stored amount of time it takes for the record player to complete a revolution around the stationary record. In one or more embodiments, the amount of time it takes for the record player to complete a revolution around the stationary record is stored each time the record player completes a revolution around the stationary record. In one or more embodiments, the method further comprises determining an amount of force experienced by the needle repeatedly at a plurality of predetermined periods of time; and updating the gyroscope information based on the determined amount of force experienced by the needle at each of the plurality of the predetermined periods of time. In one or more embodiments, the method further comprises determining an amount of pivot experienced by a needle assembly repeatedly at a plurality of predetermined periods of time, wherein the needle is included in the needle assembly; and updating the infrared information based on the determined amount of pivot experienced by the needle assembly at each of the plurality of the predetermined periods of time. In one or more embodiments, the method further comprises decreasing the determined desired speed as the record player travels forward.

In one or more embodiments, a system for reading a record comprises a computer processor; a memory; and a stationary record reading engine executing on the computer processor and configured to: receive audio information based on vibrations of a needle traveling in a groove of the stationary record, wherein the needle is included in a record player located at least in part on top of the stationary record, and wherein the record player includes a motor and wheels that enable the record player to travel around the stationary record; receive infrared light intensity information based on an intensity of infrared light received at an infrared receiver, wherein the infrared receiver receives the infrared light from an infrared emitter, and wherein the infrared emitter and the infrared receiver are included in the record player; receive gyroscope information, wherein the gyroscope information is based on an amount of force experienced by the needle, and wherein the gyroscope information is generated by a gyroscope included in the record player; determine a width of the groove of the stationary record, wherein the width of the groove of the stationary record is determined based on the received infrared light intensity information and the received gyroscope information; determine a desired speed of the record player, wherein the desired speed of the record player changes based on the width of the groove of the stationary record; and cause the motor to spin at a speed to propel the record player to achieve the determined desired speed and read the stationary record. In one or more embodiments, the system is further configured to receive data via the infrared light at the infrared receiver, wherein the determined width of the groove of the stationary record is also determined based on the received data. In one or more embodiments, the system is further configured to decrease the intensity of the infrared light in response to the record player traveling around the stationary record.

Figure 18:
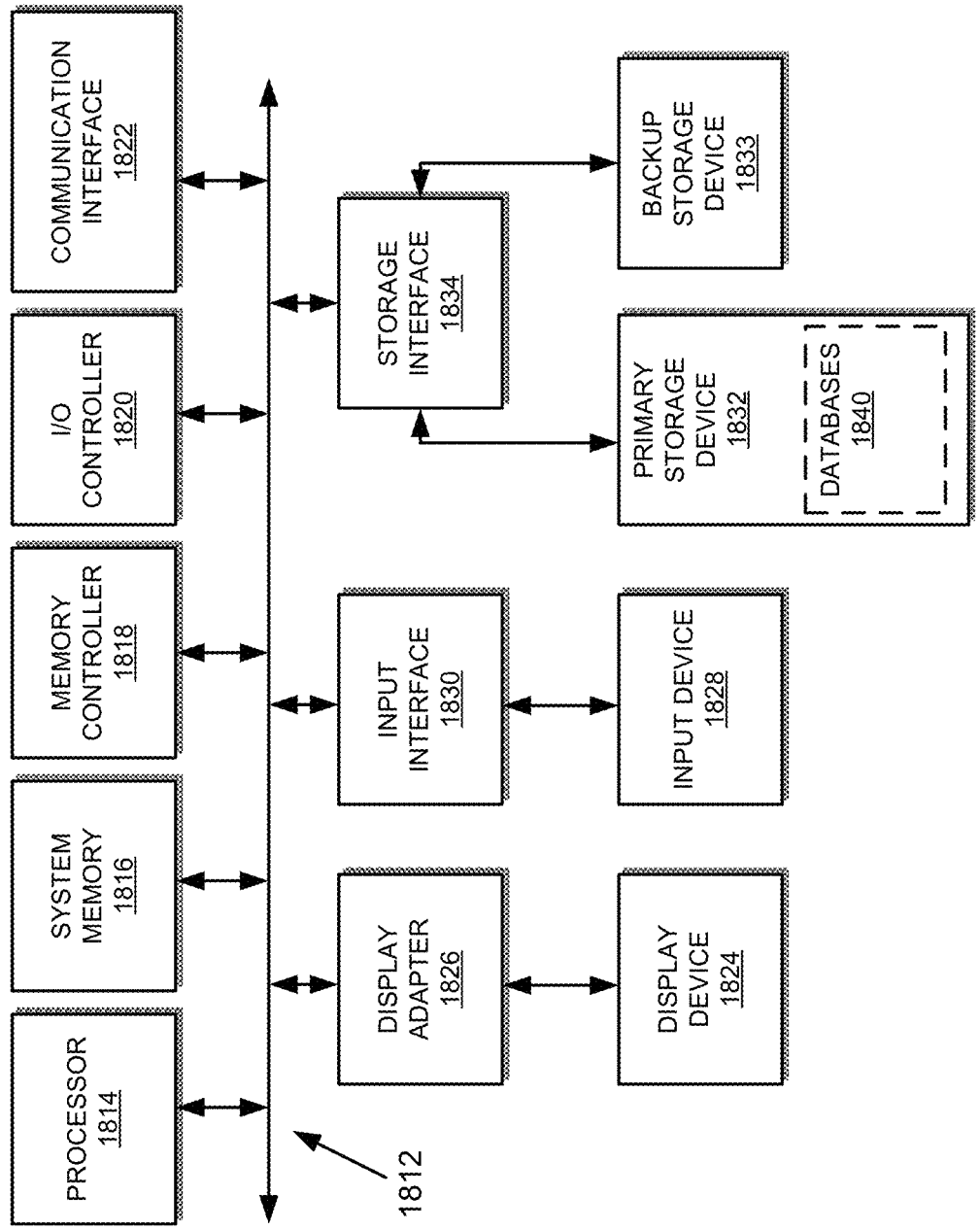
FIG. 18 illustrates a block diagram of an example of a computing system, in accordance with some embodiments.

FIG. 18 illustrates a block diagram of an example of a computing system 1899 capable of implementing embodiments of the present disclosure, according to some embodiments. Computing system 1899 broadly represents any single or multi-processor computing device or system capable of executing computer-readable instructions. Examples of computing system 1899 include, without limitation, workstations, laptops, client-side terminals, servers, distributed computing systems, handheld devices, or any other computing system or device. Herein, a record player may be considered a computing system. In its most basic configuration, computing system 1899 may include at least one processor 1814 and a system memory 1816.

Processor 1814 generally represents any type or form of processing unit capable of processing data or interpreting and executing instructions. In certain embodiments, processor 1814 may receive instructions from a software application or module. These instructions may cause processor 1814 to perform the functions of one or more of the example embodiments described and/or illustrated herein.

System memory 1816 generally represents any type or form of volatile or non-volatile storage device or medium capable of storing data and/or other computer-readable instructions. Examples of system memory 1816 include, without limitation, RAM, ROM, flash memory, or any other suitable memory device. Although not required, in certain embodiments computing system 1899 may include both a volatile memory unit (such as, for example, system memory 1816) and a non-volatile storage device (such as, for example, primary storage device 1832).

Computing system 1899 may also include one or more components or elements in addition to processor 1814 and system memory 1816. For example, in the embodiment of FIG. 18, computing system 1899 includes a memory controller 1818, an input/output (I/O) controller 1820, and a communication interface 1822, each of which may be interconnected via a communication infrastructure 1812.

Communication infrastructure 1812 generally represents any type or form of infrastructure capable of facilitating communication between one or more components of a computing device. Examples of communication infrastructure 1812 include, without limitation, a communication bus (such as an Industry Standard Architecture (ISA), Peripheral Component Interconnect (PCI), PCI Express (PCIe), or similar bus) and a network.

Memory controller 1818 generally represents any type or form of device capable of handling memory or data or controlling communication between one or more components of computing system 1899. For example, memory controller 1818 may control communication between processor 1814, system memory 1816, and I/O controller 1020 via communication infrastructure 1812.

I/O controller 1820 generally represents any type or form of module capable of coordinating and/or controlling the input and output functions of a computing device. For example, I/O controller 1820 may control or facilitate transfer of data between one or more elements of computing system 1899, such as processor 1814, system memory 1816, communication interface 1822, display adapter 1826, input interface 1830, and storage interface 1834.

Communication interface 1822 broadly represents any type or form of communication device or adapter capable of facilitating communication between example computing system 1899 and one or more additional devices. For example, communication interface 1822 may facilitate communication between computing system 1899 and a private or public network including additional computing systems. Examples of communication interface 1812 include, without limitation, a wired network interface (such as a network interface card), a wireless network interface (such as a wireless network interface card), a modem, and any other suitable interface. In one embodiment, communication interface 1822 provides a direct connection to a remote server via a direct link to a network, such as the Internet. Communication interface 1822 may also indirectly provide such a connection through any other suitable connection.

Communication interface 1822 may also represent a host adapter configured to facilitate communication between computing system 1899 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) host adapters, Serial Advanced Technology Attachment (SATA) and External SATA (eSATA) host adapters, Advanced Technology Attachment (ATA) and Parallel ATA (PATA) host adapters, Fiber Channel interface adapters, Ethernet adapters, or the like. Communication interface 1822 may also allow computing system 1899 to engage in distributed or remote computing. For example, communication interface 1822 may receive instructions from a remote device or send instructions to a remote device for execution.

As illustrated in FIG. 18, computing system 1899 may also include at least one display device 1824 coupled to communication infrastructure 1812 via a display adapter 1826. Display device 1824 generally represents any type or form of device capable of visually displaying information forwarded by display adapter 1826. Similarly, display adapter 1826 generally represents any type or form of device configured to forward graphics, text, and other data for display on display device 1824.

As illustrated in FIG. 18, computing system 1899 may also include at least one input device 1828 coupled to communication infrastructure 1812 via an input interface 1830. Input device 1828 generally represents any type or form of input device capable of providing input, either computer- or human-generated, to computing system 1899. Examples of input device 1828 include, without limitation, a keyboard, a pointing device, a speech recognition device, or any other input device.

As illustrated in FIG. 18, computing system 1899 may also include a primary storage device 1832 and a backup storage device 1833 coupled to communication infrastructure 1812 via a storage interface 1834. Storage devices 1832 and 1833 generally represent any type or form of storage device or medium capable of storing data and/or other computer-readable instructions. For example, storage devices 1832 and 1833 may be a magnetic disk drive (e.g., a so-called hard drive), a floppy disk drive, a magnetic tape drive, an optical disk drive, a flash drive, or the like. Storage interface 1834 generally represents any type or form of interface or device for transferring data between storage devices 1832 and 1833 and other components of computing system 1899.

In one example, databases 1840 may be stored in primary storage device 1832. Databases 1840 may represent portions of a single database or computing device or it may represent multiple databases or computing devices. For example, databases 1840 may represent (be stored on) a portion of computing system 1899 and/or portions of example network architecture 1999 in FIG. 19 (below). Alternatively, databases 1840 may represent (be stored on) one or more physically separate devices capable of being accessed by a computing device, such as computing system 1899 and/or portions of network architecture 1899.

Continuing with reference to FIG. 18, storage devices 1832 and 1833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1832 and 1833 may also include other similar structures or devices for allowing computer software, data, or other computer-readable instructions to be loaded into computing system 1899. For example, storage devices 1832 and 1833 may be configured to read and write software, data, or other computer-readable information. Storage devices 1832 and 1833 may also be a part of computing system 1899 or may be separate devices accessed through other interface systems.

Many other devices or subsystems may be connected to computing system 1899. Conversely, all of the components and devices illustrated in FIG. 18 need not be present to practice the embodiments described herein. The devices and subsystems referenced above may also be interconnected in different ways from that shown in FIG. 18. Computing system 1899 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 1899. All or a portion of the computer program stored on the computer-readable medium may then be stored in system memory 1816 and/or various portions of storage devices 1832 and 1833. When executed by processor 1814, a computer program loaded into computing system 1899 may cause processor 1814 to perform and/or be a means for performing the functions of the example embodiments described and/or illustrated herein. Additionally or alternatively, the example embodiments described and/or illustrated herein may be implemented in firmware and/or hardware.

For example, a computer program for requesting advertising content for display by a thin client application may be stored on the computer-readable medium and then stored in system memory 1816 and/or various portions of storage devices 1832 and 1833. When executed by the processor 1814, the computer program may cause the processor 1814 to perform and/or be a means for performing the functions required for carrying out the process described with regard to the flowcharts discussed above.

Figure 19:
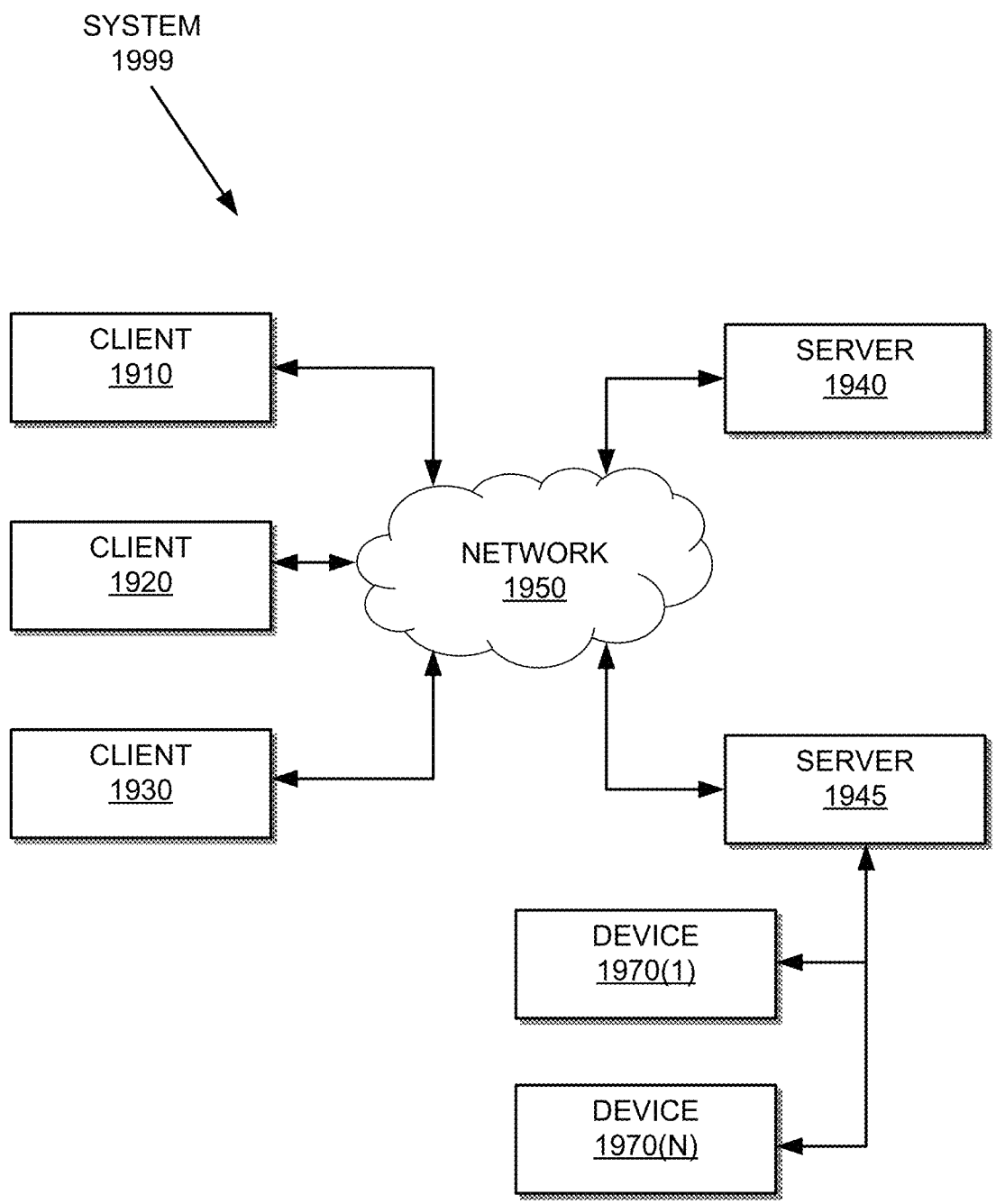
FIG. 19 illustrates a block diagram of an example of a network architecture, in accordance with some embodiments.

FIG. 19 illustrates a block diagram of an example of a network architecture 1999 in which client systems 1910, 1920, and 1930 and servers 1940 and 1945 may be coupled to a network 1950, in accordance with some embodiments. Client systems 1910, 1920, and 1930 generally represent any type or form of computing device or system. For example, multiple record players could potentially send information over a wireless network, and that information could be stored in a server or another device.

Similarly, servers 1940 and 1945 generally represent computing devices or systems, such as application servers or database servers, configured to provide various database services and/or run certain software applications. Network 1950 generally represents any telecommunication or computer network including, for example, an intranet, a wide area network (WAN), a local area network (LAN), a personal area network (PAN), or the Internet.

With reference to computing system 1999 of FIG. 19, a communication interface, such as communication interface 1922, may be used to provide connectivity between each client system 1910, 1920, and 1930 and network 1950. Client systems 1910, 1920, and 1930 may be able to access information on server 1940 or 1945 using, for example, a Web browser, thin client application, or other client software. Such software may allow client systems 1910, 1920, and 1930 to access data hosted by server 1940, server 1945, or storage devices 1970(1)-(N). Although FIG. 19 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 1940, server 1945, storage devices 1970(1)-(N), or any combination thereof. All or a portion of one or more of the example embodiments disclosed herein may also be encoded as a computer program, stored in server 1940, run by server 1945, and distributed to client systems 1910, 1920, and 1930 over network 1950.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A system comprising:
    a needle assembly, wherein the needle assembly:
        is operable to pivot with respect to a record player body;
        is operable to mount a needle, wherein the needle is operable to read data stored on a phonographic record; and
        includes a light gate operable to variably block emitted light proportional to a pivot angle of the needle assembly; and
    the record player body including:
        a motor and a set of wheels enabling the record player body to travel around a stationary phonographic record;
        an MCU including a clock and a memory, wherein the MCU is operable to calculate a target linear travel speed of the record player body;
        a light emitter;
        a light sensor communicatively coupled with the MCU, wherein the light sensor is operable to measure light intensity of light emitted from the light emitter and variably blocked by the light gate;
        a gyroscope communicatively coupled with the MCU; and
        a wireless transmitter operable to broadcast audio data read from the phonographic record by the needle for playback.

2. The system of claim 1, wherein calculating the target linear travel speed of the record player body comprises:
    receiving, at the MCU and from the light sensor, a light intensity value;
    converting, by the MCU, the light intensity value to a corresponding pivot angle of the needle assembly; and
    determining, by the MCU, a phonographic record position of the record player body based on the pivot angle.

3. The system of claim 2, wherein the light sensor communicates the light intensity value in a digital format.

4. The system of claim 1, wherein calculating the target linear travel speed of the record player body comprises:
    measuring a first elapsed time for the completion of a first traversal around the phonographic record by the record player body;
    measuring a second elapsed time for the completion of a second traversal around the phonographic record by the record player body; and
    comparing the first elapsed time and the second elapsed time to determine a phonographic record groove spacing.

5. The system of claim 4, wherein the first traversal and the second traversal are each one revolution around the phonographic record.

6. The system of claim 4, wherein start and stop measuring angular positions for each traversal around the phonographic record are determined at least in part by the gyroscope.

7. The system of claim 4, further comprising determining, by the MCU, a target linear travel speed deceleration rate based on the phonographic record groove spacing.

8. The system of claim 1, wherein the needle assembly includes a needle cartridge receptacle, wherein the needle cartridge receptacle is operable to secure a needle cartridge including the needle.

9. The system of claim 1, wherein the light emitter is operable to emit infrared light and the light sensor is operable to measure infrared light.

10. A method comprising:
    causing, by an MCU of a record player, a record player body to travel around a stationary phonographic record at a first linear travel speed, wherein the record player body path is directed by a needle following a groove path of the stationary phonographic record;
    measuring a turn angle of the record player body with respect to the stationary phonographic record, wherein the turn angle is proportional to a pivot angle of a needle assembly of the record player body, wherein the needle assembly includes the needle;
    determining a radial position of the record player body based on the turn angle;
    measuring an elapsed time between two angular positions of the record player body with respect to the stationary phonographic record;
    determining a center-to-center groove spacing based on the elapsed time;
    determining, by the MCU, a target linear travel speed of the record player body based on the turn angle of the record player body and the center-to-center groove spacing;
    causing, by the MCU, the record player body to travel at the target linear travel speed; and
    wirelessly broadcasting audio data read from the stationary phonographic record for playback.

11. The method of claim 10, wherein measuring the turn angle of the record player body comprises measuring the pivot angle of the needle assembly using a potentiometer.

12. The method of claim 10, wherein measuring the elapsed time between two angular positions comprises measuring angular positions of the record player body using a gyroscope.

13. A method comprising:
    causing, by an MCU of a record player, a record player body to travel around a stationary phonographic record at a first linear travel speed;
    measuring a turn angle of the record player body with respect to the stationary phonographic record;
    measuring a center-to-center groove spacing of the stationary phonographic record;

determining, by the MCU, a target linear travel speed of the record player body based on the turn angle of the record player body and the center-to-center groove spacing;

causing, by the MCU, the record player body to travel at the target linear travel speed; and wirelessly broadcasting audio data read from the stationary phonographic record for playback.

14. The method of claim 13, wherein measuring the turn angle of the record player body comprises measuring a pivot angle of a needle assembly of the record player.

15. The method of claim 14, wherein measuring the pivot angle of the needle assembly comprises:

emitting, by a light emitter, infrared light; and measuring, by a light sensor communicatively coupled with the MCU, an intensity of the emitted infrared light variably blocked by a light gate proportionally to the pivot angle of the needle assembly.

16. The method of claim 13, wherein measuring a center-to-center groove spacing comprises:

measuring a first elapsed time between a first angular position and a second angular position of the record player body with respect to the stationary phonographic record;

measuring a second elapsed time between a third angular position and a fourth angular position of the record player body with respect to the stationary phonographic record; and comparing the first elapsed time and the second elapsed time to determine a time delta value.

17. The method of claim 16, further comprising determining a target linear travel speed deceleration rate based on the time delta value.

18. The method of claim 16, wherein the first angular position and the second angular position are the same.

19. The method of claim 16, wherein:

the first angular position and the third angular position are the same; and the second angular position and the fourth angular position are the same.

20. The method of claim 16, wherein the first angular position and the second angular position are determined, by the MCU, based on gyroscopic force measurement information.

* * * * *